US012230212B2

(12) United States Patent
Pyun et al.

(10) Patent No.: US 12,230,212 B2
(45) Date of Patent: Feb. 18, 2025

(54) DRIVING CONTROLLER AND DISPLAY DEVICE INCLUDING THE SAME

(71) Applicant: SAMSUNG DISPLAY CO., LTD., Yongin-si (KR)

(72) Inventors: Kihyun Pyun, Yongin-si (KR); Sung-Mo Yang, Yongin-si (KR)

(73) Assignee: SAMSUNG DISPLAY CO., LTD, Yongin-si (KR)

( * ) Notice: Subject to any disclaimer, the term of this patent is extended or adjusted under 35 U.S.C. 154(b) by 0 days.

(21) Appl. No.: 18/427,919

(22) Filed: Jan. 31, 2024

(65) Prior Publication Data

US 2024/0371326 A1 Nov. 7, 2024

(30) Foreign Application Priority Data

May 2, 2023 (KR) ........................ 10-2023-0056941

(51) Int. Cl.
*G09G 3/3258* (2016.01)

(52) U.S. Cl.
CPC ... *G09G 3/3258* (2013.01); *G09G 2300/0842* (2013.01); *G09G 2320/0626* (2013.01); *G09G 2330/021* (2013.01); *G09G 2330/04* (2013.01)

(58) Field of Classification Search
CPC ......... G09G 3/3258; G09G 2300/0842; G09G 2320/0626
See application file for complete search history.

(56) References Cited

U.S. PATENT DOCUMENTS

| | | | | |
|---|---|---|---|---|
| 8,558,767 | B2 | 10/2013 | Kwon | |
| 9,041,626 | B2 | 5/2015 | Park et al. | |
| 11,250,774 | B2 * | 2/2022 | Kang | G09G 3/3225 |
| 11,501,702 | B2 * | 11/2022 | Seo | H10K 59/38 |
| 11,605,331 | B2 | 3/2023 | Pyun et al. | |
| 12,020,615 | B2 * | 6/2024 | Pyun | G09G 3/20 |
| 12,039,930 | B2 * | 7/2024 | Pyun | G09G 3/2096 |

FOREIGN PATENT DOCUMENTS

| | | |
|---|---|---|
| KR | 10-0639005 | 10/2006 |
| KR | 10-0893482 | 4/2009 |
| KR | 10-0894606 | 4/2009 |
| KR | 10-2020-0079695 A | 7/2020 |
| KR | 10-2022-0134806 A | 10/2022 |

* cited by examiner

*Primary Examiner* — Doon Y Chow
(74) *Attorney, Agent, or Firm* — F. Chau & Associates, LLC

(57) ABSTRACT

Disclosed is a display device which includes a display panel including a plurality of pixels, a voltage generator providing a driving voltage to the plurality of pixels, and a driving controller. The driving controller includes an overcurrent protecting circuit. The overcurrent protecting circuit includes a first logic circuit comparing a limit current with a sensing current to generate a first comparison result, a second logic circuit comparing a load with a limit load to generate a second comparison result and comparing the driving voltage with a limit voltage to generate a third comparison result. When the first comparison result indicates the sensing current is greater than or equal to the limit current, the second comparison result indicates the load is greater than the limit load and the third comparison result indicates the driving voltage is greater than the limit voltage, a driving voltage controller maintains the driving voltage.

20 Claims, 15 Drawing Sheets

DRIVING CONTROLLER AND DISPLAY DEVICE INCLUDING THE SAME

CROSS-REFERENCE TO RELATED APPLICATIONS

This U.S. patent application claims priority under 35 U.S.C. § 119 to Korean Patent Application No. 10-2023-0056941 filed on May 2, 2023, in the Korean Intellectual Property Office, the disclosure of which is incorporated by reference in its entirety herein.

1. TECHNICAL FIELD

Embodiments of the present disclosure described herein are generally directed to a driving controller that controls power consumption and a display device that includes the same.

2. DISCUSSION OF RELATED ART

A display device is a connection medium between a user and information. Examples of the display device include organic light emitting display devices and quantum dot light emitting display devices.

The display device may be used in multi-media devices such as a television, a mobile phone, a tablet computer, a navigation system, and a game console.

The display device typically includes a display panel including a plurality of light emitting elements. When a display area of the display panel is driven in a white mode, a larger number of the light emitting elements need to be driven. However, use of a large number of light emitting elements increases a load and thus increases power consumption.

SUMMARY

At least one embodiment of the present disclosure provides a driving controller whose power consumption is reduced and a display device including the same.

According to an embodiment, a display device includes a display panel, a voltage generator, and a driving controller. The display panel includes a plurality of pixels. The voltage generator provides a driving voltage to the plurality of pixels. The driving controller receives an image signal and drives the plurality of pixels. The driving controller include an overcurrent protecting circuit. The overcurrent protecting unit includes a first logic circuit, a second logic circuit, and a driving voltage controller. The first logic circuit compares a limit current with a sensing current generated by sensing a driving current flowing to the plurality of pixels to generate a first comparison result. The second logic circuit compares a load of previous image data of the image signal with a limit load to generate a second comparison result and compares the driving voltage with a limit voltage to generate a third comparison result. The driving voltage controller outputs a driving voltage control signal for controlling the driving voltage to the voltage generator. When the first comparison result indicates the sensing current is greater than or equal to the limit current and the second comparison result indicates the load is greater than the limit load and the third comparison result indicates the driving voltage is greater than the limit voltage, the driving voltage controller outputs the driving voltage control signal for maintaining the driving voltage.

When the first comparison result indicates the sensing current is less than the limit current and the second comparison result indicates the load is less than or equal to the limit load, the driving voltage controller may output the driving voltage control signal for maintaining the driving voltage.

When the first comparison result indicates the sensing current is less than the limit current and the second comparison result indicates the driving voltage is less than or equal to the limit voltage, the driving voltage controller may output the driving voltage control signal for maintaining the driving voltage.

When the first comparison result indicates the sensing current is greater than or equal to the limit current and at least one of the second comparison result indicates the load is less than or equal to the limit load and the third comparison result indicates the driving voltage is less than or equal to the limit voltage, the driving voltage controller may output the driving voltage control signal for decreasing the driving voltage.

When the first comparison result indicates the sensing current is less than the limit current, the second comparison result indicates the load is greater than the limit load and the third comparison result indicates the driving voltage is greater than the limit voltage, the driving voltage controller may output the driving voltage control signal for maintaining the driving voltage.

The driving voltage controller may include a driving voltage code generator that is connected to the first and second logic circuits and outputs a driving voltage control code, and a driving voltage converter that outputs the driving voltage control signal based on the driving voltage control code.

The driving controller may further include a power control circuit, a limit voltage calculating circuit, and a driving voltage determining circuit.

Each of the power control circuit, the limit voltage calculating circuit, and the driving voltage determining circuit may be connected to the overcurrent protecting circuit.

The power control circuit may receive image data, which are generated based on the image signal, and a dimming signal and may output the load of the previous image data.

The dimming signal may include a dimming gain signal and a dimming peak signal.

The limit voltage calculating circuit may receive the dimming signal and outputs the limit voltage based on the dimming signal.

The driving voltage determining circuit may receive the image signal and output the driving voltage based on the image signal.

The limit load may be about 75% of a maximum load of the image data.

According to an embodiment, a driving controller includes a first logic circuit, a second logic circuit, and a driving voltage controller. The first logic circuit compares a limit current with a sensing current generated by sensing a driving current flowing to a display panel to generate a first comparison result. The second logic circuit compares a load of previous image data with a limit load to generate a second comparison result and compares a driving voltage with a limit voltage to generate a third comparison result. The driving voltage controller outputs a driving voltage control signal for controlling the driving voltage to the display panel. When the first comparison result indicates the sensing current is greater than or equal to the limit current, the second comparison result indicates the load is greater than the limit load and the third comparison result indicates the driving voltage is greater than the limit voltage, the driving voltage controller may output the driving voltage control signal for maintaining the driving voltage.

When the first comparison result indicates the sensing current is less than the limit current and at least one of the second comparison result indicates the load is less than or equal to the limit load and the third comparison result indicates the driving voltage is less than or equal to the limit voltage, the driving voltage controller may output the driving voltage control signal for maintaining the driving voltage.

When the first comparison result indicates the sensing current is less than the limit current, the second comparison result indicates the load is greater than the limit load and the third comparison result indicates the driving voltage is greater than the limit voltage, the driving voltage controller may output the driving voltage control signal for maintaining the driving voltage.

When the first comparison result indicates the sensing current is greater than or equal to the limit current and at least one of the second comparison result indicates the load is less than or equal to the limit load and the third comparison result indicates the driving voltage is less than or equal to the limit voltage, the driving voltage controller may output the driving voltage control signal for decreasing the driving voltage.

The driving controller may further include a power control circuit, a limit voltage calculating circuit, and a driving voltage determining circuit, and the power control circuit may receive image data and a dimming signal and output the load of the previous image data.

The limit voltage calculating circuit may receive the dimming signal and may output the limit voltage based on the dimming signal.

The driving voltage determining circuit may receive an image signal and output the driving voltage based on the image signal.

DETAILED DESCRIPTION

Figure 1:
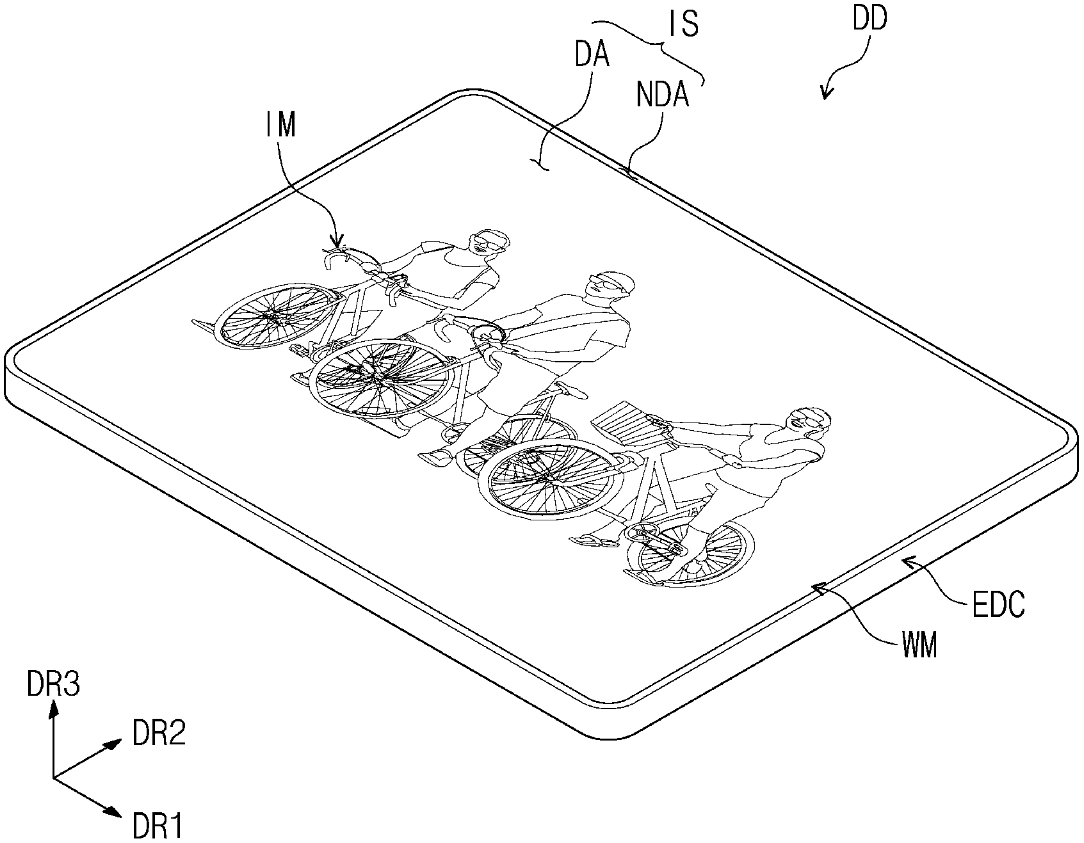
FIG. 1 is a perspective view illustrating a display device according to an embodiment of the present disclosure.

Hereinafter, exemplary embodiments are described in detail with reference to the accompanying drawings; however, they may be embodied in different forms and should not be construed as limited to the embodiments set forth herein.

In the specification, the expression that a first component (or area, layer, part, portion, etc.) is "on", "connected with", or "coupled to" a second component means that the first component is directly on, connected with, or coupled to the second component or means that a third component is disposed therebetween.

Like reference numerals refer to like components throughout. The term "and/or" includes one or more combinations that the associated elements may define.

The articles "a", "an", and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

The term "about" as used herein is inclusive of the stated value and means within an acceptable range of deviation for the particular value as determined by one of ordinary skill in the art, considering the measurement in question and the error associated with measurement of the particular quantity, such as the limitations of the measurement system. For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

Below, embodiments of the present disclosure will be described with reference to drawings.

Figure 2:
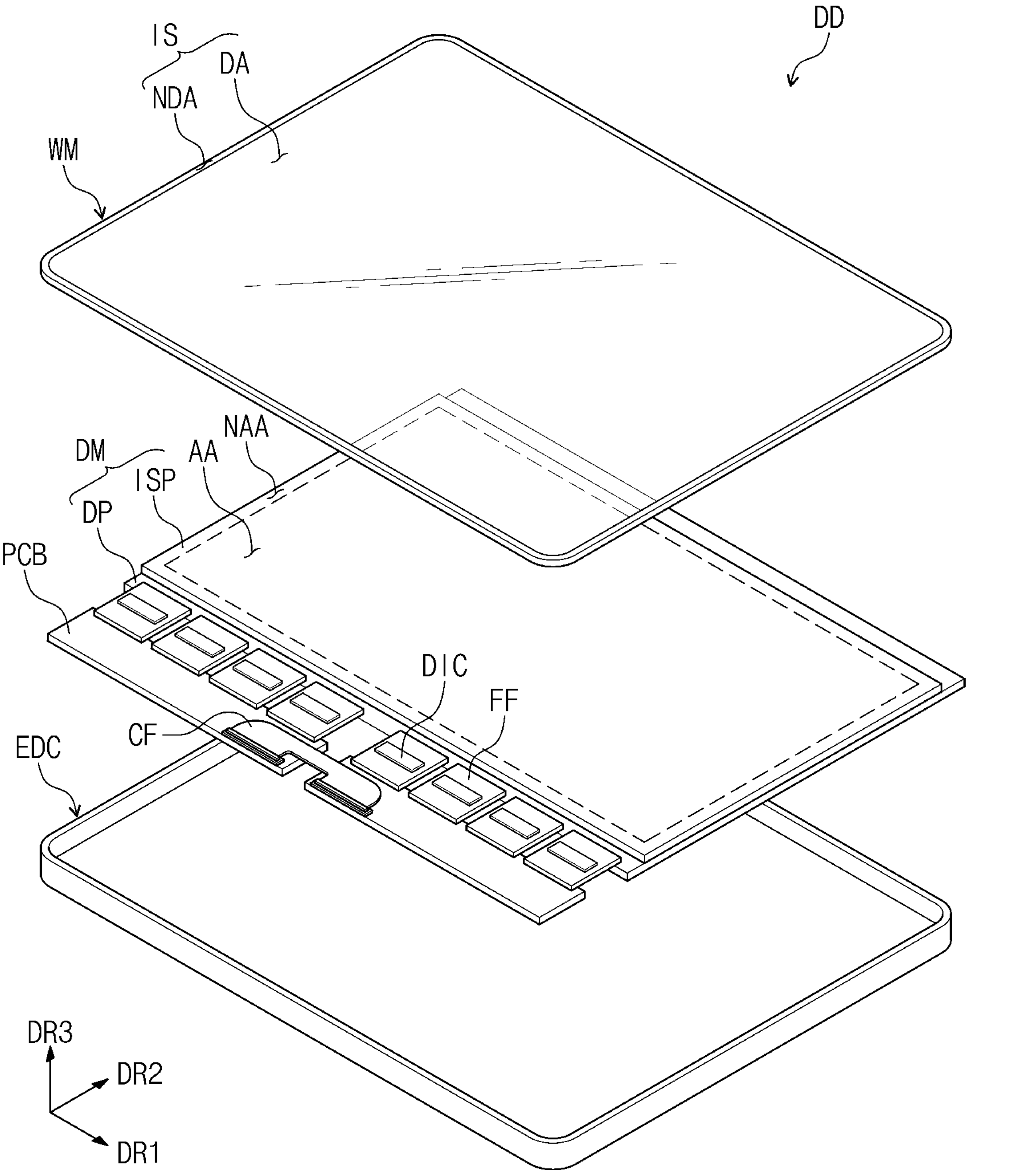
FIG. 2 is an exploded perspective view of a display device according to an embodiment of the present disclosure.

FIG. 1 is a perspective view of a display device according to an embodiment of the present disclosure, and FIG. 2 is an exploded perspective view of a display device according to an embodiment of the present disclosure.

Referring to FIGS. 1 and 2, a display device DD may be a device that is activated depending on an electrical signal. The display device DD according to the present disclosure may be a small or medium-sized electronic device such as a mobile phone, a tablet, an automotive navigation system, or a game console, or a large-sized electronic device such as a television or a monitor. The above devices are provided only as an example, and the display device DD may be implemented in other electronic devices without departing from the concept of the invention. The display device DD is in the shape of a rectangle having a long edge (or side) in a first direction DR1 and having a short edge (or side) in a second direction DR2 intersecting the first direction DR1. However, the shape of the display device DD is not limited thereto. For example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined with respect to a direction in which the image IM is displayed. The front surface and the rear surface may be opposite to each other in the third direction DR3, and the normal direction of each of the front surface and the rear surface may be parallel to the third direction DR3.

A separation distance between the front surface and the rear surface in the third direction DR3 may correspond to a thickness of the display device DD in the third direction DR3. Directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD according to an embodiment of the present disclosure may sense an external input of a user, which is applied from the outside. The external input of the user may be one of various types of external inputs, such as a part of the body, light, heat, an eye, and pressure, or a combination thereof. Also, the display device DD may sense the external input of the user applied to the side surface or rear surface of the display device DD depending on a structure of the display device DD and is not limited to any one embodiment. As an example of the present disclosure, the external input may include an input that is applied by using an input device (e.g., a stylus pen, an active pen, a touch pen, an electronic pen, or an E-pen).

The display surface IS of the display device DD may be divided into a display area DA and a non-display area NDA. The display area DA may refer to an area in which the image IM is displayed. A user may visually perceive the image IM through the display area DA. In an embodiment, the display area DA is illustrated in the shape of a quadrangle whose vertexes are rounded. However, this is illustrated as an example. The display area DA may have various shapes, and is not limited to any one embodiment.

The non-display area NDA is adjacent to the display area DA. The non-display area NDA may have a given color. The non-display area NDA may surround the display area DA. As such, the shape of the display area DA may be defined substantially by the non-display area NDA. However, this is illustrated as an example. The non-display area NDA may be disposed adjacent to only one side of the display area DA or may be omitted. The display device DD according to an embodiment of the present disclosure may include various embodiments and is not limited to any one embodiment.

As illustrated in FIG. 2, the display device DD may include a display module DM and a window WM disposed on or over the display module DM. The display module DM may include a display panel DP and an input sensing layer ISP.

The display panel DP according to an embodiment of the present disclosure may be a light emitting display panel. For example, the display panel DP may be an organic light emitting display panel, an inorganic light emitting display panel, or a quantum dot light emitting display panel. An emission layer of the organic light emitting display panel may include an organic light emitting material. An emission layer of the inorganic light emitting display panel may include an inorganic light emitting material. An emission layer of the quantum dot light emitting display panel may include a quantum dot, a quantum rod, etc.

The display panel DP may output the image IM, and the output image IM may be displayed through the display surface IS.

The input sensing layer ISP may be disposed on the display panel DP to sense an external input. The input sensing layer ISP may be directly disposed on the display panel DP. According to an embodiment of the present disclosure, the input sensing layer ISP may be formed on the display panel DP by a consecutive process. That is, in the case where the input sensing layer ISP is directly disposed on the display panel DP, an inner adhesive film (not illustrated) is not interposed between the input sensing layer ISP and the display panel DP. However, the inner adhesive film may be interposed between the input sensing layer ISP and the display panel DP. In this case, the input sensing layer ISP is not manufactured by a process subsequent to that of the display panel DP. That is, the input sensing layer ISP may be manufactured through a process that is independent of the process used to manufacture the display panel DP and may then be fixed on the upper surface of the display panel DP by the inner adhesive film.

The window WM may be formed of a transparent material capable of outputting the image IM. For example, the window WM may be formed of glass, sapphire, plastic, etc. An example in which the window WM is implemented with a single layer is illustrated, but the present disclosure is not limited thereto. For example, the window WM may include a plurality of layers.

The non-display area NDA of the display device DD described above may correspond to an area that is defined by printing a material including a given color on one area of the window WM. As an example of the present disclosure, the window WM may include a light blocking (or shielding) pattern for defining the non-display area NDA. The light blocking pattern that is a colored organic film may be formed, for example, in a coating manner.

The window WM may be coupled to the display module DM by an adhesive film. For example, the adhesive film may include an optically clear adhesive (OCA) film. However, the adhesive film is not limited thereto. For example, the adhesive film may include an adhesive agent or a sticking agent. For example, the adhesive film may include an optically clear resin (OCR) film or a pressure sensitive adhesive (PSA) film.

An anti-reflection layer may be further interposed between the window WM and the display module DM. The anti-reflection layer decreases reflectance of an external light incident from above the window WM. The anti-reflection layer according to an embodiment of the present disclosure may include a retarder and a polarizer. The retarder may be a retarder of a film type or a liquid crystal coating type and may include a θ/2 retarder and/or a θ/4 retarder. The polarizer may also be of a film type or a liquid crystal coating type. The film type may include a stretch-type synthetic resin film, and the liquid crystal coating type may include liquid crystals arranged in a given direction. The phase retarder and the polarizer may be implemented with one polarization film.

As an example, the anti-reflection layer may also include color filters. The arrangement of color filters may be determined in consideration of colors of lights that a plurality of pixels PX (refer to FIG. 3) included in the display panel DP generate. In this case, the anti-reflection layer may further include a light blocking pattern interposed between color filters.

The display module DM may display the image IM depending on an electrical signal and may transmit/receive information about an external input. The display module DM may be defined by an effective area AA and a non-effective area NAA. The effective area AA may be defined as an area in which the image IM is output from the display panel DP (i.e., an area in which the image IM is displayed). Also, the effective area AA may be defined as an area in which the input sensing layer ISP senses an external input applied from the outside. According to an embodiment, the effective area AA of the display module DM may correspond to (or overlap) at least a portion of the display area DA.

The non-effective area NAA is adjacent to the effective area AA. The non-effective area NAA may refer to an area in which the image IM is not displayed or not displayed substantially. For example, the non-effective area NAA may surround the effective area AA. However, this is illustrated as an example. For example, the non-effective area NAA may be defined in various shapes, and is not limited to any one embodiment. According to an embodiment, the non-effective area NAA of the display module DM may correspond to (or overlap) at least a portion of the non-display area NDA.

The display device DD may further include a plurality of flexible films FF connected to the display panel DP. A driver chip DIC may be mounted on each of the flexible films FF. As an example of the present disclosure, a data driver 200 (refer to FIG. 3) may include the plurality of driver chips DIC, and the plurality of driver chips DIC may be respectively mounted on the plurality of flexible films FF.

The display device DD may further include at least one circuit board PCB coupled to the plurality of flexible films FF. An example in which two circuit boards PCB are provided in the display device DD is illustrated in FIG. 2, but the number of circuit boards PCB is not limited thereto. Two circuit boards adjacent to each other from among the circuit boards PCB may be electrically connected to each other by a connection film CF. Also, at least one of the circuit boards PCB may be electrically connected to a main board. A driving controller 100 (refer to FIG. 3) and a voltage generator 300 (refer to FIG. 3) may be disposed on at least one of the circuit boards PCB.

FIG. 2 shows a structure in which the driver chips DIC are respectively mounted on the flexible films FF, but the present disclosure is not limited thereto. For example, the driver chips DIC may be directly mounted on the display panel DP. In this case, a portion of the display panel DP, on which the driver chip DIC is mounted, may be bent such that the driver chip DIC is disposed on the rear surface of the display module DM.

The input sensing layer ISP may be electrically connected to the circuit board PCB through the flexible films FF. However, the present disclosure is not limited thereto. That is, the display module DM may additionally include a separate flexible film for electrically connecting the input sensing layer ISP and the circuit board PCB.

The display device DD further includes a housing EDC for accommodating the display module DM. The housing EDC may be coupled to the window WM to define the exterior of the display device DD. The housing EDC may absorb external shocks and may prevent foreign material/moisture or the like from being infiltrated into the display module DM such that components accommodated in the housing EDC are protected. As an example, the housing EDC may be provided in the form of a combination of a plurality of accommodating members.

The display device DD according to an embodiment may further include an electronic module including various functional modules for operating the display module DM, a power supply module (e.g., a battery) for supplying a power necessary for an overall operation of the display device DD, a bracket coupled to the display module DM and/or the housing (or outer housing) EDC to partition an inner space of the display device DD, etc.

Figure 3:
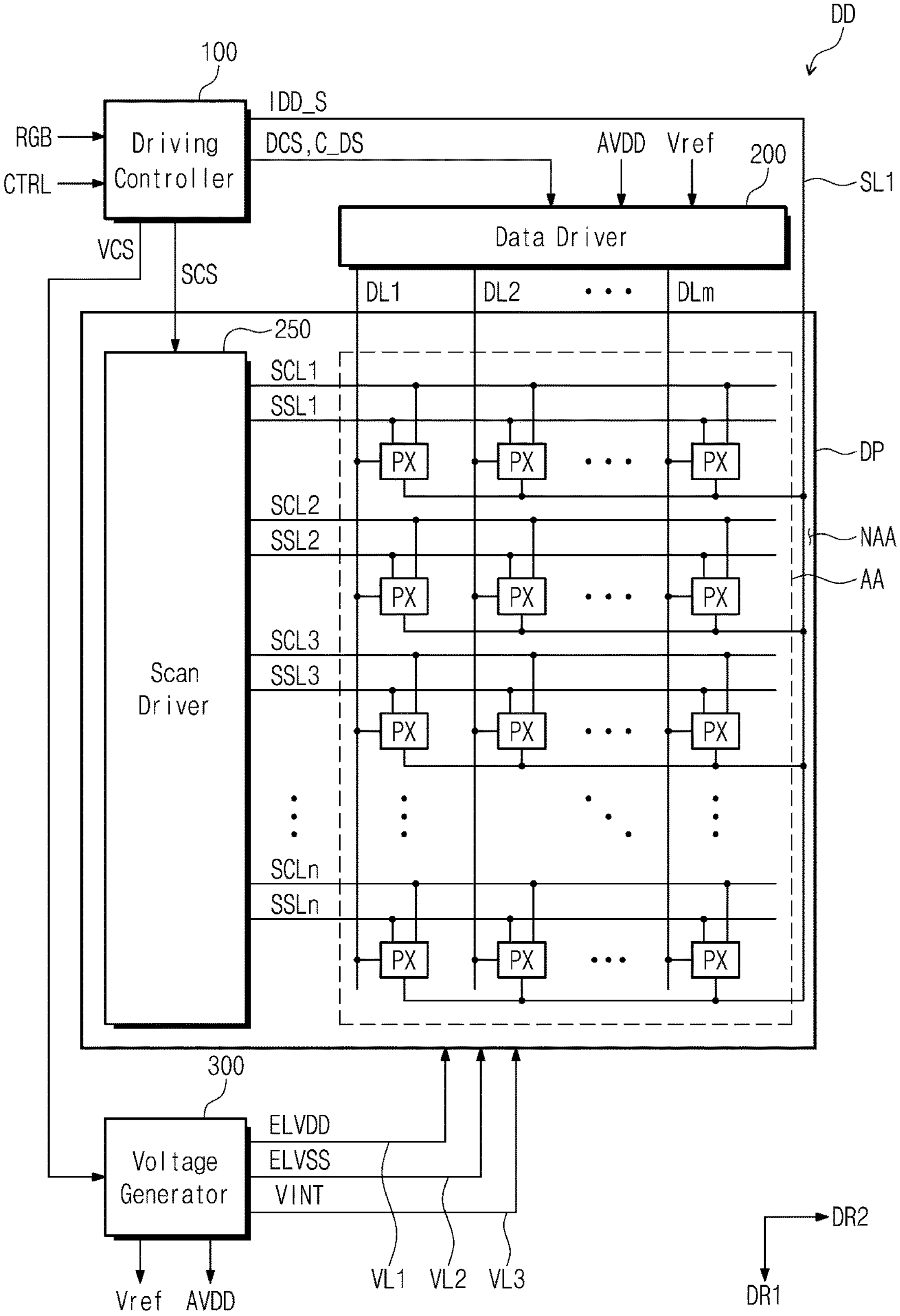
FIG. 3 is a block diagram of a display device, according to an embodiment of the present disclosure.

FIG. 3 is a block diagram of a display device according to an embodiment of the present disclosure.

Referring to FIG. 3, the display device DD includes the driving controller 100 (e.g., a controller circuit), the data driver 200 (e.g., a driver circuit), a scan driver 250 (e.g., a driver circuit), the voltage generator 300, and the display panel DP.

The driving controller 100 may receive an image signal RGB and a control signal CTRL from a main controller (e.g., a micro controller). The driving controller 100 may generate image data I_DS (refer to FIG. 5) by converting a data format of the image signal RGB in compliance with the specification for an interface with the data driver 200.

The driving controller 100 may calculate a load based on the image data I_DS (refer to FIG. 5), may compensate for the image data I_DS (refer to FIG. 5) based on the load to generate compensation image data C_DS, and may output the compensation image data C_DS.

The driving controller 100 may generate a scan control signal SCS and a data control signal DCS based on the control signal CTRL.

The data driver 200 may receive the data control signal DCS and the compensation image data C_DS from the driving controller 100. The data driver 200 may convert the compensation image data C_DS into data signals (or data voltages) based on a gamma reference voltage Vref and a data driving voltage AVDD and may output the data signals to a plurality of data lines DL1 and DL2 to DLm (m being a natural number greater than 1) to be described below. The data signals may refer to analog voltages corresponding to grayscale values of the compensation image data C_DS. The data driver 200 may be disposed within the driver chip DIC illustrated in FIG. 2.

The display panel DP may be connected to the driving controller 100, the data driver 200, and the voltage generator 300. The display panel DP according to an embodiment of the present disclosure may be a light emitting display panel but is not particularly limited thereto. For example, the display panel DP may be an organic light emitting display panel, a quantum dot display panel, a micro-LED display panel, or a nano-LED display panel. The display panel DP may include the scan driver 250 and the plurality of pixels PX.

The scan driver 250 may receive the scan control signal SCS from the driving controller 100. In response to the scan control signal SCS, the scan driver 250 may output first scan signals to a plurality of first scan lines SCL1, SCL2, and SCL3 to SCLn (n being a natural number greater than 1) to be described below and may output second scan signals to a plurality of second scan lines SSL1, SSL2, and SSL3 and SSLn to be described below.

The display panel DP may include the plurality of first scan lines SCL1, SCL2, and SCL3 to SCLn, the plurality of second scan lines SSL1, SSL2, and SSL3 and SSLn, the plurality of data lines DL1 and DL2 to DLm, and the plurality of pixels PX. The display panel DP may be divided into the effective area AA and the non-effective area NAA. The plurality of pixels PX may be disposed in the effective area AA, and the scan driver 250 may be disposed in the non-effective area NAA.

Each of the plurality of first scan lines SCL1, SCL2, and SCL3 to SCLn and the plurality of second scan lines SSL1, SSL2, and SSL3 and SSLn may extend to be parallel to the second direction DR2. The plurality of first scan lines SCL1, SCL2, and SCL3 to SCLn and the plurality of second scan lines SSL1, SSL2, and SSL3 and SSLn may be arranged to be spaced from each other in the first direction DR1.

Each of the plurality of data lines DL1 and DL2 to DLm may extend from the data driver 200 to be parallel to the first direction DR1. The plurality of data lines DL1 and DL2 to DLm may be arranged to be spaced from each other in the second direction DR2.

The plurality of pixels PX may be electrically connected to the plurality of first scan lines SCL1, SCL2, and SCL3 to SCLn, the plurality of second scan lines SSL1, SSL2, and SSL3 and SSLn, and the plurality of data lines DL1 and DL2 to DLm. For example, pixels of a first row may be connected to the scan lines SCL1 and SSL1, and pixels of a second row may be connected to the scan lines SCL2 and SSL2.

In an embodiment, the scan driver 250 may be disposed on the first side of the display panel DP. The scan driver 250 may be disposed adjacent to the first side of the effective area AA, but the present disclosure is not limited thereto. For example, different parts of the scan driver 250 may be disposed adjacent to each of the first side and the second side of the effective area AA. For example, a first part of the scan driver 250 that is disposed adjacent to the first side of the effective area AA may provide the first scan signals to the first scan lines SCL1, SCL2, and SCL3 to SCLn, and a second part of the scan driver 250 that is disposed adjacent to the second side of the effective area AA may provide the second scan signals to the second scan lines SSL1, SSL2, and SSL3 to SSLn.

Each of the plurality of pixels PX may receive a first driving voltage (or a driving voltage) ELVDD, a second driving voltage ELVSS, and an initialization voltage VINT. The first driving voltage ELVDD may be higher than the second driving voltage ELVSS.

The voltage generator 300 may generate voltages necessary for the operation of the display panel DP. In an embodiment of the present disclosure, the voltage generator 300 generates the first driving voltage ELVDD, the second driving voltage ELVSS, and the initialization voltage VINT, which are used for the operation of the display panel DP.

The first driving voltage ELVDD may be provided to the display panel DP through a first voltage line (or a driving voltage line) VL1. The second driving voltage ELVSS may be provided to the display panel DP through a second voltage line VL2. The initialization voltage VINT may be provided to the display panel DP through a third voltage line VL3.

In addition to the first driving voltage ELVDD, the second driving voltage ELVSS, and the initialization voltage VINT, the voltage generator 300 may further generate various voltages (e.g., the gamma reference voltage Vref, the data driving voltage AVDD, a gate-on voltage, and a gate-off voltage) used for the operations of the data driver 200 and the scan driver 250.

The driving controller 100 may be connected to a sensing line SL1. The driving controller 100 may sense a sensing current IDD_S flowing through the sensing line SL1 in units of sensing frames.

The driving controller 100 may compare the sensing current IDD_S and a preset reference current to generate a signal depending on a result of the comparison. The driving controller 100 may generate a driving voltage control signal VCS for controlling the voltage level of the first driving voltage ELVDD generated from the voltage generator 300, based on the signal. The driving voltage control signal VCS thus generated may be provided to the voltage generator 300.

Figure 4:
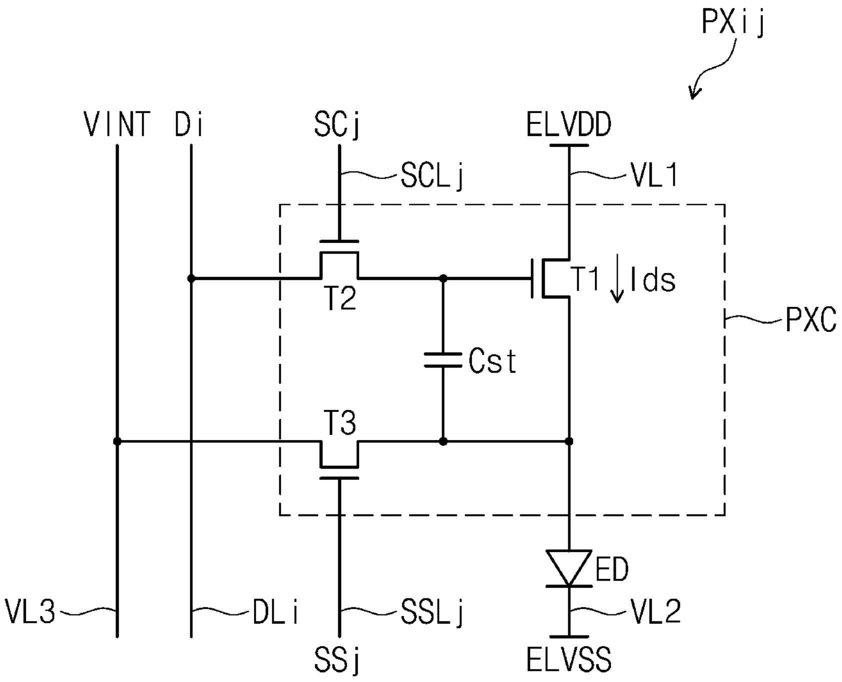
FIG. 4 is an equivalent circuit diagram of a pixel according to an embodiment of the present disclosure.

FIG. 4 is an equivalent circuit diagram of a pixel according to an embodiment of the present disclosure.

An equivalent circuit diagram of a pixel PXij that is connected to the i-th data line DLi among the plurality of data lines DL1 and DL2 to DLm, the j-th first scan line SCLj among the plurality of first scan lines SCL1, SCL2, and SCL3 to SCLn, and the j-th second scan line SSLj among the plurality of second scan lines SSL1, SSL2, and SSL3 to SSLn is illustrated in FIG. 4 as an example.

Each of the plurality of pixels PX (refer to FIG. 3) illustrated in FIG. 3 may have substantially the same circuit configuration as the equivalent circuit of the pixel PXij illustrated in FIG. 4.

Referring to FIG. 4, the pixel PXij may include a light emitting element ED and a pixel circuit unit PXC controlling the emission of the light emitting element ED. The pixel circuit unit PXC may include a plurality of transistors and a capacitor. The pixel circuit unit PXC may include transistors formed through the same process as the scan driver 250 (refer to FIG. 3). In an embodiment, the light emitting element ED may be an organic light emitting diode. However, the present disclosure is not limited thereto. For example, the light emitting element ED may include a quantum dot, a quantum rod, a micro-LED, a nano-LED, etc.

The pixel circuit unit PXC may include at least one transistor that is electrically connected to the light emitting element ED and is used to provide a current corresponding to a data signal Di transferred from the data line DLi to the light emitting element ED. As an embodiment of the present disclosure, the pixel circuit unit PXC of the pixel PXij includes a first transistor T1, a second transistor T2, a third transistor T3, and a capacitor Cst. Each of the first to third transistors T1 to T3 may be an N-type transistor using an oxide semiconductor as a semiconductor layer. However, the present disclosure is not limited thereto. For example, each of the first to third transistors T1 to T3 may be a P-type transistor having a low-temperature polycrystalline silicon (LTPS) semiconductor layer. Alternatively, at least one of the first to third transistors T1 to T3 may be an N-type transistor, and the others thereof may be P-type transistors.

The first scan line SCLj may transfer a first scan signal SCj, and the second scan line SSLj may transfer a second scan signal SSj. The data line DLi transfers the data signal Di. The data signal Di may have a voltage level corresponding to the compensation image data C_DS (refer to FIG. 3). For example, the first scan line SCLj may transfer the first scan signal SCj to a gate of the second transistor T2 and the second scan line SSLj may transfer the second scan signal SSj to a gate of the third transistor T3.

The first voltage line VL1 may transfer the first driving voltage ELVDD to the pixel circuit unit PXC, the second voltage line VL2 may transfer the second driving voltage ELVSS to a cathode (or a second terminal) of the light emitting element ED, and the third voltage line VL3 may transfer the initialization voltage VINT to the pixel circuit unit PXC.

The first transistor T1 includes a first electrode connected to the first voltage line VL1, a second electrode electrically connected to an anode (or a first terminal) of the light emitting element ED, and a gate electrode connected to a first end of the capacitor Cst. The first transistor T1 may supply a driving current Ids to the light emitting element ED in response to the data signal Di transferred through the data line DLi depending on a switching operation of the second transistor T2. The driving current Ids may be sensed as the sensing current IDD_S (refer to FIG. 3) through the sensing line SL1 (refer to FIG. 3).

The second transistor T2 includes a first electrode connected to the data line DLi, a second electrode connected to the gate electrode of the first transistor T1, and a gate electrode connected to the first scan line SCLj. The second transistor T2 may be turned on depending on the first scan signal SCj transferred through the first scan line SCLj and may transfer the data signal Di from the data line DLi to the gate electrode of the first transistor T1.

The third transistor T3 includes a first electrode connected to the third voltage line VL3, a second electrode connected to the anode of the light emitting element ED, and a gate electrode connected to the second scan line SSLj. The third transistor T3 may be turned on depending on the second scan signal SSj transferred through the second scan line SSLj and may transfer the initialization voltage VINT to the anode of the light emitting element ED.

The first end of the capacitor Cst is connected to the gate electrode of the first transistor T1, and a second end of the capacitor Cst is connected to the second electrode of the first transistor T1. The structure of the pixel PXij according to an embodiment is not limited to the structure illustrated in FIG. 4. In the pixel PXij, the number of transistors, the number of capacitors, and a connection relationship of the transistors and the capacitors may be variously changed or modified.

Figure 5:
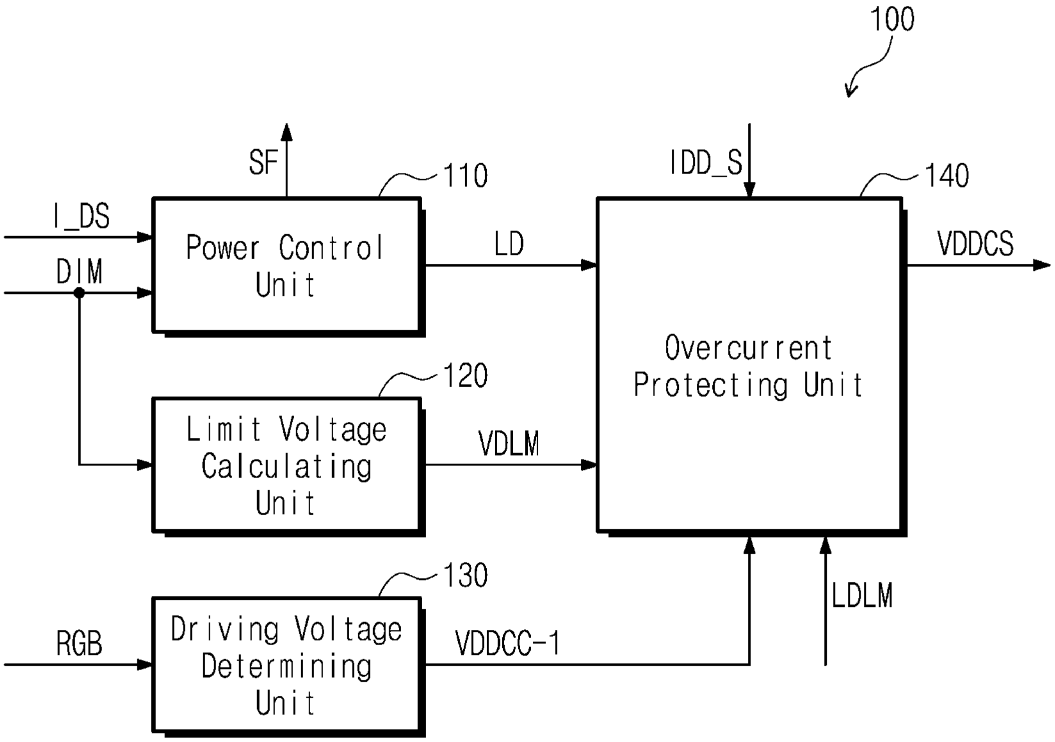
FIG. 5 is a block diagram of a driving controller according to an embodiment of the present disclosure.

FIG. 5 is a block diagram of a driving controller according to an embodiment of the present disclosure.

Referring to FIG. 5, the driving controller 100 includes a power control unit 110 (e.g., a power control circuit), a limit voltage calculating unit 120 (e.g., a calculating circuit), a driving voltage determining unit 130 (e.g., a logic circuit), and an overcurrent protecting unit 140 (e.g., a protection circuit).

The power control unit 110 may directly receive the image signal RGB or may receive the image data I_DS converted from the image signal RGB. The image data I_DS may be input in units of frames.

The power control unit 110 may receive a dimming signal DIM. The dimming signal DIM may be changed based on external illuminance.

The power control unit 110 may perform a dimming operation. The dimming operation may perform a driving method of setting a maximum luminance reference value and setting a low-luminance grayscale by using a gamma curve associated with a luminance for each grayscale. The dimming signal DIM may be a signal that is used for performing the dimming operation. Grayscale data of the image signal RGB of one frame received from the outside may be changed by using the dimming signal DIM. The dimming signal DIM may include a dimming gain signal and a dimming peak signal.

The power control unit 110 may calculate a load LD of one frame based on the image data I_DS. The power control unit 110 may generate a scale factor SF for adjusting the grayscale of the image data I_DS. The power control unit 110 may be connected to the overcurrent protecting unit 140.

The limit voltage calculating unit 120 may receive the dimming signal DIM. The limit voltage calculating unit 120 may output a limit voltage VDLM based on the dimming signal DIM. The limit voltage VDLM may be used as a criterion for determining a driving voltage code VDDCC-1 of the driving voltage ELVDD. The limit voltage calculating unit 120 may be connected to the overcurrent protecting unit 140.

The driving voltage determining unit 130 may receive the image signal RGB. The driving voltage determining unit 130 may output the driving voltage code VDDCC-1 based on the image signal RGB. In detail, the driving voltage determining unit 130 may analyze the image signal RGB to generate information about a grayscale for an image. The driving voltage determining unit 130 may determine the driving voltage code VDDCC-1 of the driving voltage ELVDD used to drive the display panel DP, based on the grayscale for the image. The driving voltage code VDDCC-1 may be provided in the form of a digital signal.

The overcurrent protecting unit 140 may be connected to the power control unit 110, the limit voltage calculating unit 120, and the driving voltage determining unit 130.

The overcurrent protecting unit 140 may receive the load LD, the limit voltage VDLM, the sensing current IDD_S, and a limit load LDLM. The limit load LDLM may be used as a criterion for determining the magnitude of the load LD of the image data I_DS and will be described below.

Figure 6:
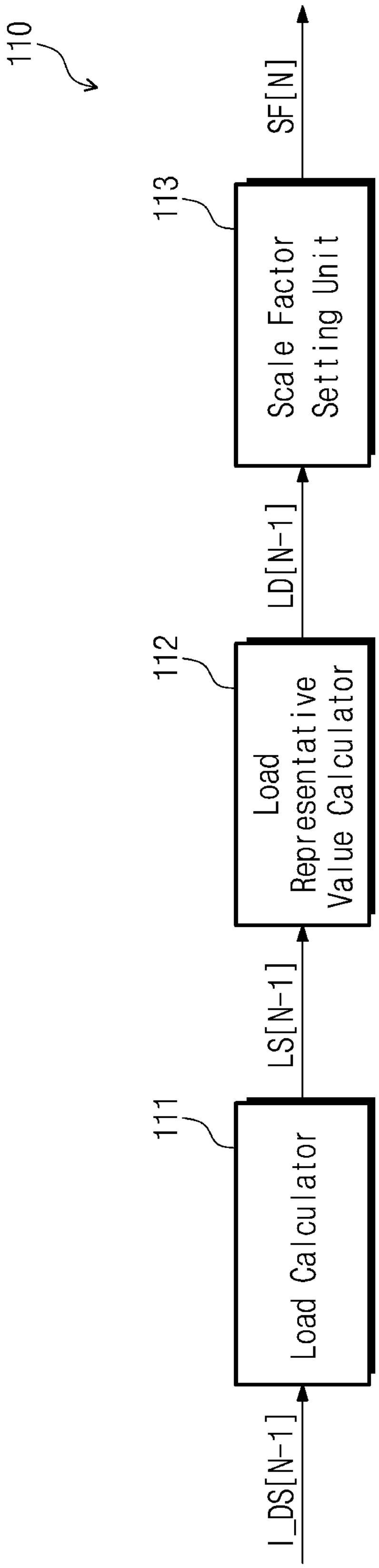
FIG. 6 is a block diagram of a power control unit according to an embodiment of the present disclosure.
Figure 7:
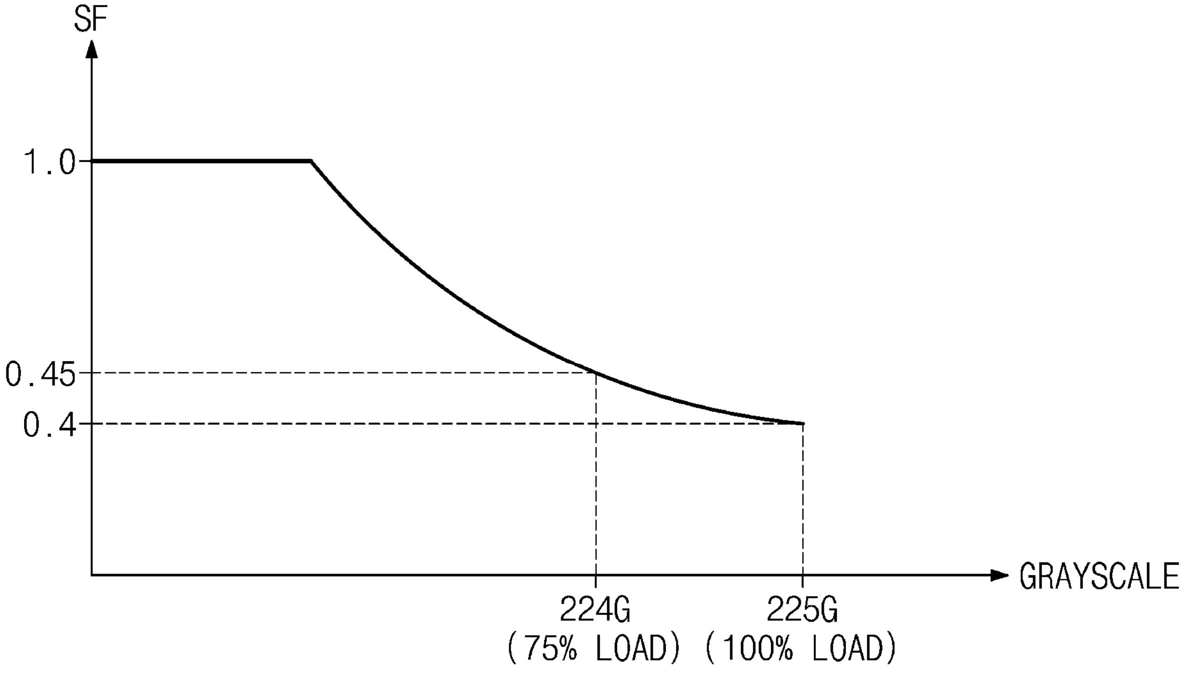
FIG. 7 is a graph illustrating a relationship between a scale factor and a grayscale of image data, according to an embodiment of the present disclosure.

FIG. 6 is a block diagram of a power control unit according to an embodiment of the present disclosure, and FIG. 7 is a graph illustrating a relationship between a scale factor and a grayscale of image data, according to an embodiment of the present disclosure.

Referring to FIGS. 6 and 7, the power control unit 110 may include a load calculator 111, a load representative value calculator 112, and a scale factor setting unit 113 (e.g., a logic circuit).

The load calculator 111 may calculate a sum LS[N−1] of all the grayscales of the (N−1)-th image data I_DS[N−1] based on the (N−1)-th image data I_DS[N−1]. For example, the display panel DP (refer to FIG. 3) may be divided into a plurality of blocks, and the load calculator 111 may calculate a sum of grayscales of each block. The load calculator 111 may calculate the sum LS[N−1] of all the grayscales of the (N−1)-th image data I_DS[N−1] by adding grayscale sums of the respective blocks. In this case, “N” may be a natural number of 2 or more. For example, the load calculator 111 may calculate a plurality of sums, where each corresponds to one of the blocks.

The load representative value calculator 112 may calculate a load LD[N−1] of the (N−1)-th image data I_DS[N−1] based on the sum LS[N−1] of all the grayscales of the (N−1)-th image data I_DS[N−1]. The load LD[N−1] may have a value between 0% and 100%. The plurality of light emitting elements ED (refer to FIG. 4) may act as a load when the display panel DP (refer to FIG. 3) is driven. As the number of driven light emitting elements ED (refer to FIG. 4) increases, the load may increase. For example, when the (N−1)-th image data I_DS[N−1] indicates a full black image (e.g., a 0-grayscale image), the load LD[N−1] may correspond to 0%. When the (N−1)-th image data I_DS[N−1] indicates a full white image (e.g., a 255-grayscale image), the load LD[N−1] may correspond to 100%.

The load representative value calculator 112 may output the load LD[N−1] to the overcurrent protecting unit 140 (refer to FIG. 5).

The scale factor setting unit 113 may generate a scale factor SF[N] based on the load LD[N−1] of the (N−1)-th image data I_DS[N−1]. To maintain or decrease the grayscale of the (N−1)-th image data I_DS[N−1], the scale factor SF[N] may have a value that is less than or equal to "1". For example, when the scale factor SF[N] is 0.5, the grayscale of the (N−1)-th image data I_DS[N−1] may be halved. For example, when the scale factor SF[N] is 1.0, the grayscale of the (N−1)-th image data I_DS[N−1] may be maintained.

As illustrated in FIG. 7, the scale factor SF may have a value of "1" from a zero gray level to a specific gray level. As the grayscale of image data increases from the specific gray level to a 255G gray level, the value of the scale factor SF may decrease from "1" to a specific value. For example, as the grayscale of image data increases from the specific gray level to the 255 gray level, the value of the scale factor SF may decrease from "1" to 0.4. However, this is an example, and the value of the scale factor SF according to an embodiment of the present disclosure is not limited thereto. When the value of the scale factor SF is less than "1" within a range from the specific gray level to the 255 gray level, the grayscale of image data may decrease, and thus, a driving current of the display panel DP (refer to FIG. 3) may decrease. Accordingly, a total power consumption of the display device DD (refer to FIG. 1) may decrease through the operation of the power control unit 110.

That is, as the display area to be driven in the white mode increases, the number of light emitting elements ED (refer to FIG. 4) to be driven may increase. In this case, because the load LD[N−1] increases, the power consumption may also increase. However, according to the present disclosure, a driving current that is supplied to the light emitting elements ED (refer to FIG. 4) may be limited. In detail, as the load LD[N−1] increases, the display panel DP (refer to FIG. 3) may be driven such that the luminance of an area to be displayed in the white mode is decreased based on the scale factor SF[N]. Accordingly, the display device DD (refer to FIG. 1) in which power consumption is reduced may be provided.

When the power control unit 110 generates the scale factor SF[N] as illustrated in FIG. 6, a delay may be caused by as much as one frame period. That is, the scale factor SF[N] that is generated based on the (N−1)-th image data I_DS[N−1] may be applied to N-th image data I_DS[N].

Figure 8A:
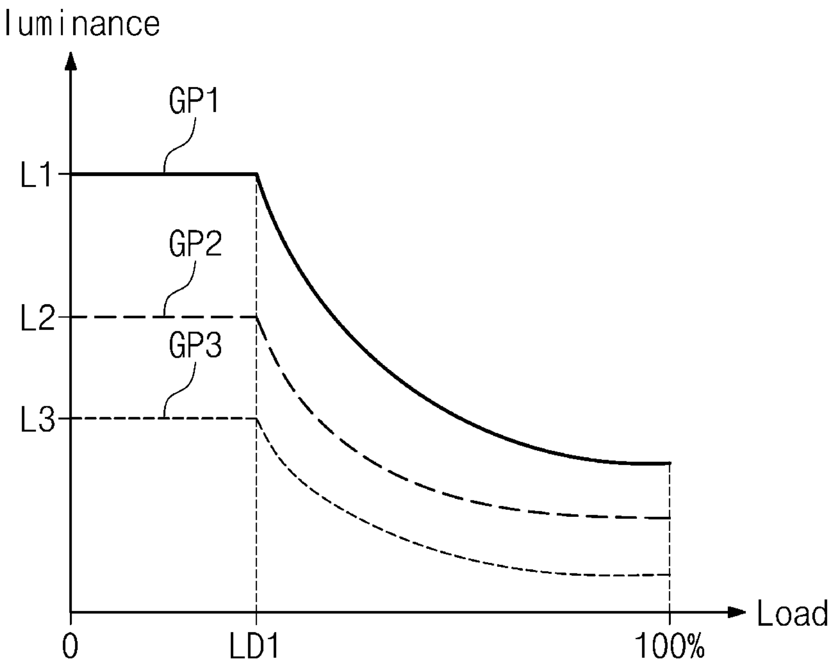
FIG. 8A is a graph illustrating a relationship between luminance and a load of image data, according to an embodiment of the present disclosure.

FIG. 8A is a graph illustrating a relationship between luminance and a load of image data, according to an embodiment of the present disclosure.

In FIG. 8A, a horizontal axis represents a load, and a vertical axis represents luminance.

Referring to FIGS. 5 and 8A, a first graph GP1 may be a graph illustrating a relationship between luminance and a load of the image data I_DS under the condition that the dimming signal DIM has a first dimming gain value. The first graph GP1 may have a first peak luminance L1 within the range from a load of 0% to a specific load LD1. As the load increases from the specific load LD1 to a load of 100%, the luminance of the first graph GP1 may decrease.

A second graph GP2 may be a graph illustrating a relationship between luminance and a load of the image data I_DS under the condition that the dimming signal DIM has a second dimming gain value less than the first dimming gain value. The second graph GP2 may have a second peak luminance L2 within the range from the load of 0% to the specific load LD1. The second peak luminance L2 may be less in value than the first peak luminance L1. As the load increases from the specific load LD1 to the load of 100%, the luminance of the second graph GP2 may decrease.

A third graph GP3 may be a graph illustrating a relationship between luminance and a load of the image data I_DS under the condition that the dimming signal DIM has a third dimming gain value less than the second dimming gain value. The third graph GP3 may have a third peak luminance L3 within the range from the load of 0% to the specific load LD1. The third peak luminance L3 may be less in value than the second peak luminance L2. As the load increases from the specific load LD1 to the load of 100%, the luminance of the third graph GP3 may decrease. The first to third dimming gain values may be values that are defined such that the luminance according to the load increases or decreases at a given ratio.

In the first to third graphs GP1, GP2, and GP3, a luminance value may be proportional to the magnitude of the dimming gain value. For example, as the magnitude of the dimming gain value decreases, the peak luminance L1, L2, and L3 of the first to third graphs GP1, GP2, and GP3 may decrease. As the magnitude of the dimming gain value decreases, the luminance of the first to third graphs GP1, GP2, and GP3, which corresponds to the load of 100%, may decrease. That is, as the magnitude of the dimming gain value decreases, the luminance of the full white may decrease.

Figure 8B:
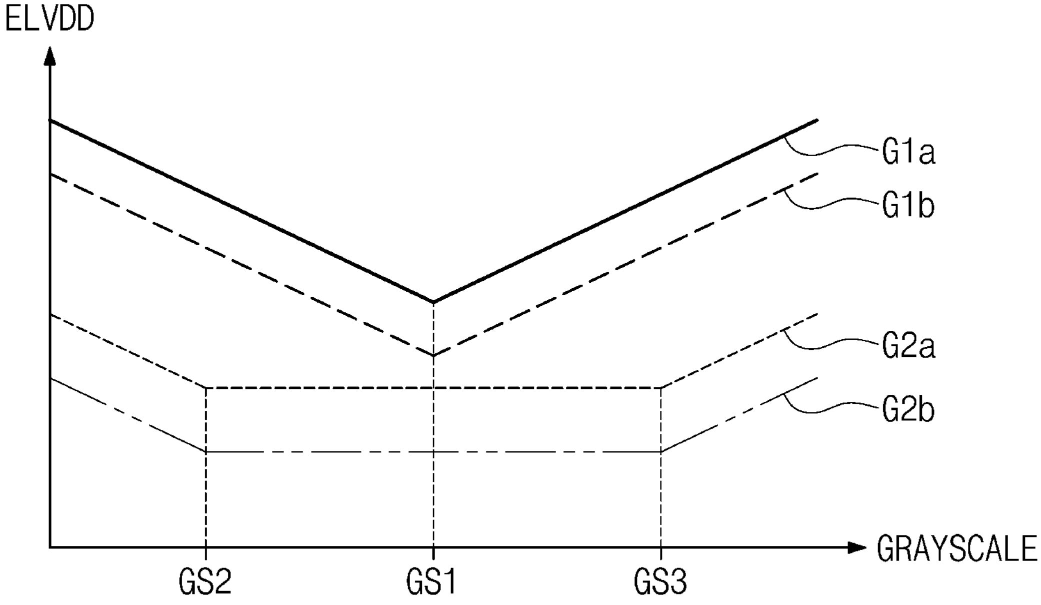
FIG. 8B is a graph illustrating a relationship between a driving voltage and a grayscale of image data, according to an embodiment of the present disclosure.

FIG. 8B is a graph illustrating a relationship between a driving voltage and a grayscale of image data, according to an embodiment of the present disclosure.

In FIG. 8B, a horizontal axis represents a grayscale, and a vertical axis represents the driving voltage ELVDD.

Referring to FIGS. 5 and 8B, a first graph G1a may be a graph illustrating a relationship between the driving voltage ELVDD and the grayscale of the image data I_DS under the condition of the first dimming gain value and the maximum load. In the first graph G1a, the driving voltage ELVDD may uniformly decrease (or linearly decrease) within the range from the zero gray level to a first specific gray level GS1. In the first graph G1a, the driving voltage ELVDD may uniformly increase (or linearly increase) within the range from the first specific gray level GS1 to the 255 gray level. The first graph G1a may have a symmetric shape with respect to the first specific gray level GS1.

A second graph G2a may be a graph illustrating a relationship between the driving voltage ELVDD and the grayscale of the image data I_DS under the condition of the first dimming gain value and the minimum load. In the second graph G2a, the driving voltage ELVDD may uniformly decrease (or linearly decrease) within the range from the zero gray level to a second specific gray level GS2. In the second graph G2a, the driving voltage ELVDD may be uniform (or constant) within the range from the second specific gray level GS2 to a third specific gray level GS3. That is, a response speed of the driving controller 100 may be increased by minimizing the change in the driving voltage ELVDD under the minimum load condition in which the driving voltage ELVDD has a relatively low voltage level. In the second graph G2a, the driving voltage ELVDD may uniformly increase (or linearly increase) within the range from the third specific gray level GS3 to the 255 gray level.

A third graph G1b may be a graph illustrating a relationship between the driving voltage ELVDD and the grayscale of the image data I_DS under the condition of the maximum load and the third dimming gain value less than the first dimming gain value. In the third graph G1b, the driving voltage ELVDD may uniformly decrease (or linearly decrease) within the range from the zero gray level to the first specific gray level GS1. In the third graph G1b, the driving voltage ELVDD may uniformly increase (or linearly increase) within the range from the first specific gray level GS1 to the 255 gray level. The third graph G1b may have a symmetric shape with respect to the first specific gray level GS1.

A fourth graph G2b may be a graph illustrating a relationship between the driving voltage ELVDD and the grayscale of the image data I_DS under the condition of the third dimming gain value and the minimum load. In the fourth graph G2b, the driving voltage ELVDD may uniformly decrease (or linearly decrease) within the range from the zero gray level to the second specific gray level GS2. In the fourth graph G2b, the driving voltage ELVDD may be uniform (or constant) within the range from the second specific gray level GS2 to the third specific gray level GS3. That is, a response speed of the driving controller 100 may be increased by minimizing the change in the driving voltage ELVDD under the minimum load condition in which the driving voltage ELVDD has a relatively low voltage level. In the fourth graph G2b, the driving voltage ELVDD may uniformly increase (or uniformly increase) within the range from the third specific gray level GS3 to the 255 gray level.

Under the same load condition, the driving voltage ELVDD corresponding to the case where the dimming gain value is relatively small may be less than the driving voltage ELVDD corresponding to the case where the dimming gain value is relatively great. That is, under the same load condition, as the dimming gain value decreases, the driving voltage ELVDD may decrease. For example, a minimum value of the driving voltage ELVDD provided to the display panel DP (refer to FIG. 3) may decrease.

The limit voltage calculating unit 120 may set the limit voltage VDLM in consideration of the driving voltage ELVDD changed based on the dimming signal DIM including the dimming gain signal.

Figure 9A:
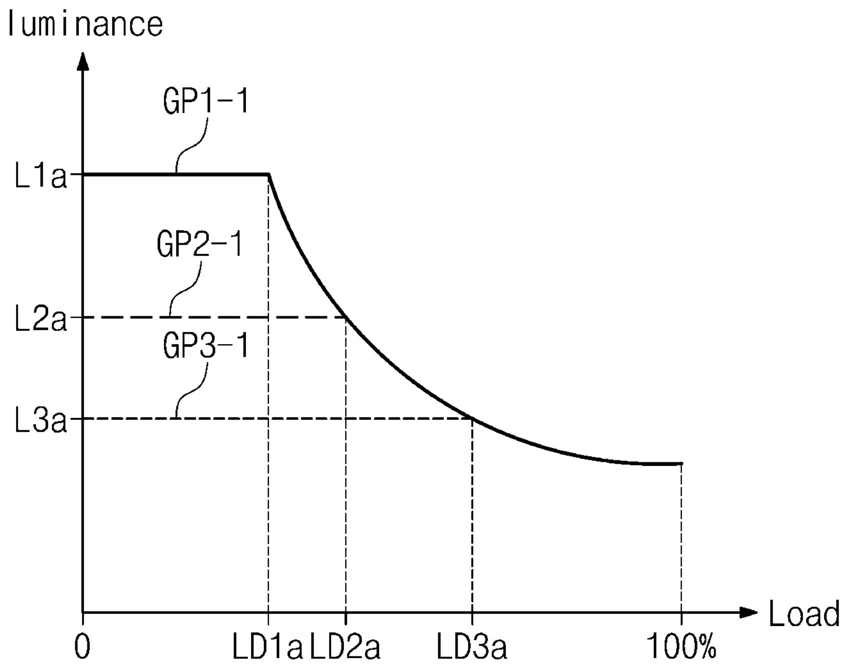
FIG. 9A is a graph illustrating a relationship between luminance and a load of image data, according to an embodiment of the present disclosure.

FIG. 9A is a graph illustrating a relationship between luminance and a load of image data, according to an embodiment of the present disclosure. In the description of FIG. 9A, the components that are described with reference to FIG. 8A are marked by the same reference numerals/signs, and thus, additional description will be omitted to avoid redundancy.

In FIG. 9A, a horizontal axis represents a load, and a vertical axis represents luminance.

Referring to FIGS. 5 and 9A, a first graph GP1-1 may be a graph illustrating a relationship between luminance and a load of the image data I_DS under the condition that the dimming signal DIM has a first dimming gain value. The first graph GP1-1 may have a first peak luminance L1a within the range from the load of 0% to a first specific load LD1a. As the load increases from the first specific load LD1a to the load of 100%, the luminance of the first graph GP1-1 may decrease.

A second graph GP2-1 may be a graph illustrating a relationship between luminance and a load of the image data I_DS under the condition that the dimming signal DIM has a second dimming gain value less than the first dimming gain value. The second graph GP2-1 may have a second peak luminance L2a within the range from the load of 0% to a second specific load LD2a. The second specific load LD2a may be greater than the first specific load LD1a. The second peak luminance L2a may be less in value than the first peak luminance L1a. As the load increases from the second specific load LD2a to the load of 100%, the luminance of the second graph GP2-1 may decrease. In the range from the second specific load LD2a to the load of 100%, the luminance of the first graph GP1-1 may be identical to the luminance of the second graph GP2-1.

A third graph GP3-1 may be a graph illustrating a relationship between luminance and a load of the image data I_DS under the condition that the dimming signal DIM has a third dimming gain value less than the second dimming gain value. The third graph GP3-1 may have a third peak luminance L3a within the range from the load of 0% to a third specific load LD3a. The third peak luminance L3a may be less in value than the second peak luminance L2a. As the load increases from the third specific load LD3a to the load of 100%, the luminance of the third graph GP3-1 may decrease. In the range from the third specific load LD3a to the load of 100%, the luminance of the first graph GP1-1 may be identical to the luminance of the third graph GP3-1.

The first to third dimming gain values may be values that are defined such that only a peak value of the luminance according to the load increases or decreases.

In the first to third graphs GP1-1, GP2-1, and GP3-1, a peak luminance value may decrease in proportion to the magnitude of the dimming gain value. For example, as the magnitude of the dimming gain value decreases, the peak luminance L1a, L2a, and L3a of the first to third graphs GP1-1, GP2-1, and GP3-1 may decrease. For example, the first graph GP1-1 may be realized due to a dimming gain value higher than a dimming value used to realize the second graph GP2-1. Similarly, the dimming gain value used to realize the second graph GP2-1 may be higher than a dimming gain value used to realize the third graph GP3-1.

Figure 9B:
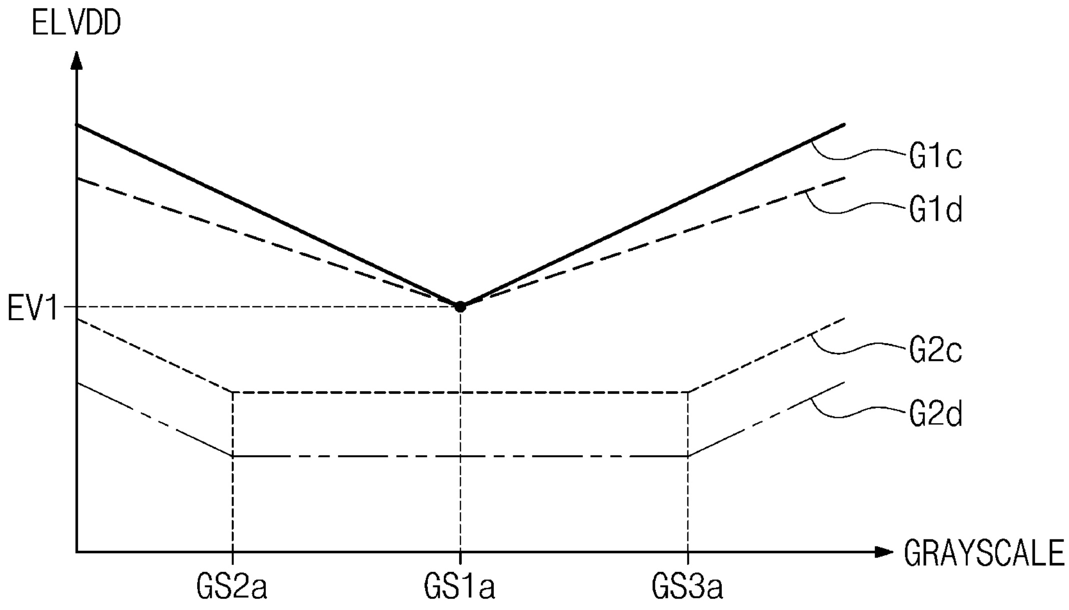
FIG. 9B is a graph illustrating a relationship between a driving voltage and a grayscale of image data, according to an embodiment of the present disclosure.

FIG. 9B is a graph illustrating a relationship between a driving voltage and a grayscale of image data, according to an embodiment of the present disclosure. In the description of FIG. 9B, the components that are described with reference to FIG. 8B are marked by the same reference numerals/signs, and thus, additional description will be omitted to avoid redundancy.

In FIG. 9B, a horizontal axis represents a grayscale, and a vertical axis represents the driving voltage ELVDD.

Referring to FIGS. 5 and 9B, a first graph G1c may be a graph illustrating a relationship between the driving voltage ELVDD and the grayscale of the image data I_DS under the condition of the first dimming gain value and the maximum load. In the first graph G1c, the driving voltage ELVDD may uniformly decrease (or linearly decrease) within the range from the zero gray level to a first specific gray level GS1a. In the first graph G1c, the driving voltage ELVDD may uniformly increase (or linearly decrease) within the range from the first specific gray level GS1a to the 255 gray level. The first graph G1c may have a symmetric shape with respect to the first specific gray level GS1a.

A second graph G2c may be a graph illustrating a relationship between the driving voltage ELVDD and the grayscale of the image data I_DS under the condition of the first dimming gain value and the minimum load. In the second graph G2c, the driving voltage ELVDD may uniformly decrease (or linearly decrease) within the range from the zero gray level to a second specific gray level GS2a. In the second graph G2c, the driving voltage ELVDD may be uniform (or constant) within the range from the second specific gray level GS2a to a third specific gray level GS3a. That is, a response speed of the driving controller 100 may be increased by minimizing the change in the driving voltage ELVDD under the minimum load condition in which the driving voltage ELVDD has a relatively low voltage level. In the second graph G2c, the driving voltage ELVDD may uniformly increase (or linearly increase) within the range from the third specific gray level GS3a to the 255 gray level.

A third graph G1d may be a graph illustrating a relationship between the driving voltage ELVDD and the grayscale of the image data I_DS under the condition of the third dimming gain value and the maximum load. In the third graph G1d, the driving voltage ELVDD may uniformly decrease (or linearly decrease) within the range from the zero gray level to the first specific gray level GS1a. In the third graph G1d, the driving voltage ELVDD may uniformly increase (or linearly increase) within the range from the first specific gray level GS1a to the 255 gray level. The third graph G1d may have a symmetric shape with respect to the first specific gray level GS1a.

The case where each value of the first graph G1c is identical to each value of the third graph G1d may correspond to the case where a target image is a full white image. In this case, a full white image may be provided whose grayscale is decreased by the power control unit 110. When the dimming peak value changes, the driving voltage ELVDD may have the same value EV1 in the third graph G1d and the first graph G1c at the full white.

A fourth graph G2d may be a graph illustrating a relationship between the driving voltage ELVDD and the grayscale of the image data I_DS under the condition of the third dimming gain value and the minimum load. In the fourth graph G2d, the driving voltage ELVDD may uniformly decrease (or linearly decrease) within the range from the zero gray level to the second specific gray level GS2a. In the fourth graph G2d, the driving voltage ELVDD may be uniform (or constant) within the range from the second specific gray level GS2a to the third specific gray level GS3a. That is, a response speed of the driving controller 100 may be increased by minimizing the change in the driving voltage ELVDD under the minimum load condition in which the driving voltage ELVDD has a relatively low voltage level. In the fourth graph G2d, the driving voltage ELVDD may uniformly increase (or linearly increase) within the range from the third specific gray level GS3a to the 255 gray level.

That is, under the same load condition, as the dimming gain value decreases, the driving voltage ELVDD may decrease. For example, a minimum value of the driving voltage ELVDD provided to the display panel DP (refer to FIG. 3) may decrease.

In an embodiment, the limit voltage calculating unit 120 sets the limit voltage VDLM in consideration of the driving voltage ELVDD changed based on the dimming signal DIM including the dimming peak signal. For example, the limit voltage calculating unit 120 may determine an amount that the driving voltage ELVDD is changed by the dimming peak signal, and set the limit voltage VDLM based on the amount.

Figure 10:
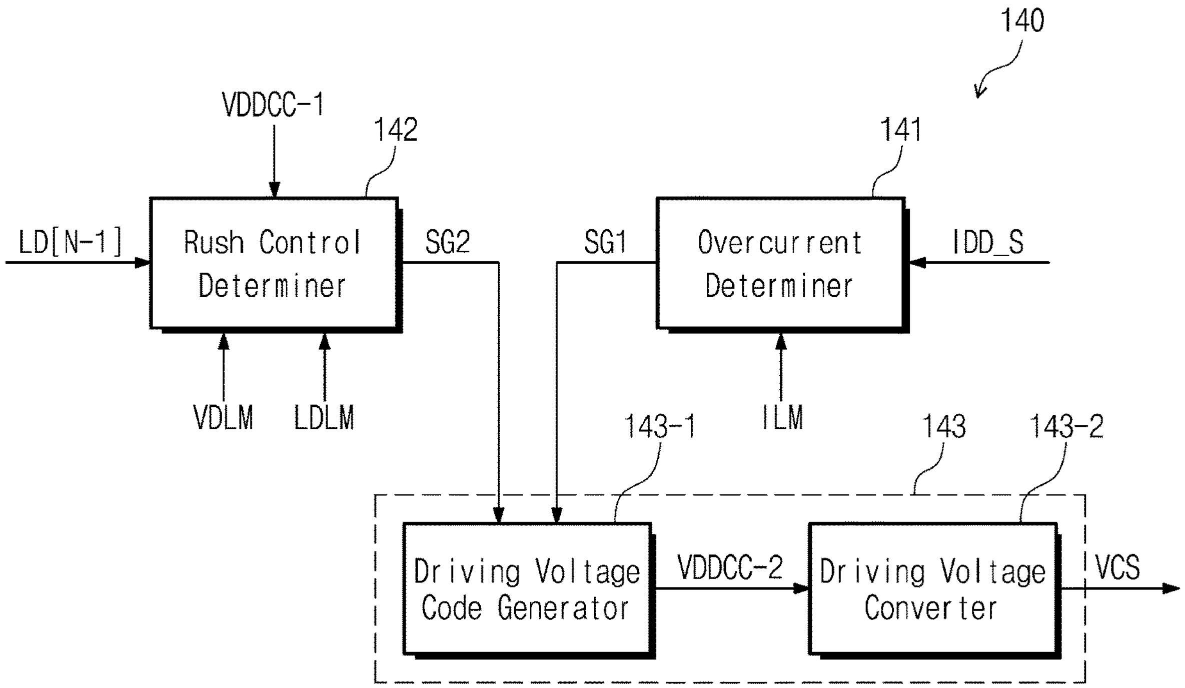
FIG. 10 is a block diagram illustrating an overcurrent protecting unit according to an embodiment of the present disclosure.
Figure 11A:
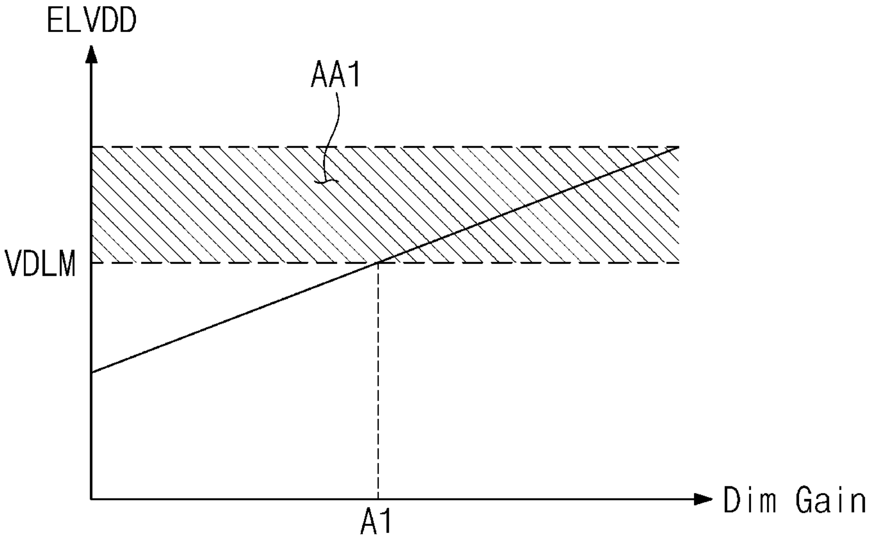
FIG. 11A is a graph illustrating a relationship between a driving voltage and a dimming gain, according to an embodiment of the present disclosure.
Figure 11B:
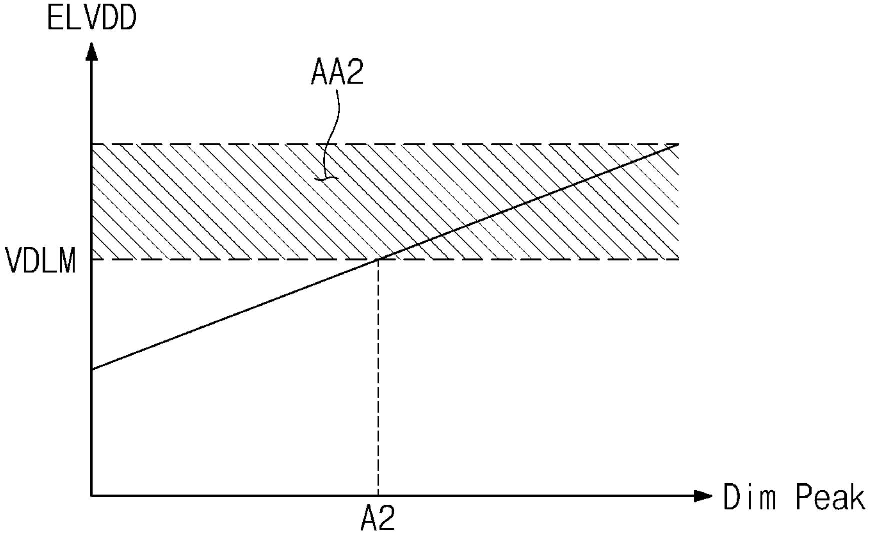
FIG. 11B is a graph illustrating a relationship between a driving voltage and a dimming peak, according to an embodiment of the present disclosure.

FIG. 10 is a block diagram illustrating an overcurrent protecting unit according to an embodiment of the present disclosure. FIG. 11A is a graph illustrating a relationship between a driving voltage and a dimming gain, according to an embodiment of the present disclosure. FIG. 11B is a graph illustrating a relationship between a driving voltage and a dimming peak, according to an embodiment of the present disclosure.

Referring to FIGS. 5, 6, and 10, the overcurrent protecting unit 140 may include an overcurrent determiner 141 (e.g., a first logic circuit), a rush control determiner 142 (e.g., a second logic circuit), and a driving voltage controller 143 (e.g., a controller circuit).

The overcurrent determiner 141 may compare the sensing current IDD_S and a limit current ILM to generate a first signal SG1 and output the first signal SG1. The sensing current IDD_S may be a value obtained by sensing the driving current Ids (refer to FIG. 4). The limit current ILM may be an upper limit of the driving current Ids, which is determined in advance. The power consumption of the display panel DP (refer to FIG. 3) may be proportional to the magnitude of the driving current Ids (refer to FIG. 4) and the magnitude of the driving voltage ELVDD (refer to FIG. 3). When the driving current Ids (refer to FIG. 4) is relatively great, the power consumption of the display panel DP (refer to FIG. 3) may be great; in this case, the display device DD (refer to FIG. 3) according to an embodiment of the present disclosure may prevent the increase in power consumption by decreasing the driving voltage ELVDD (refer to FIG. 3).

When the sensing current IDD_S is greater than or equal to the limit current ILM, to decrease the driving voltage ELVDD (refer to FIG. 3), the overcurrent determiner 141 may output the first signal SG1 set to a high level (e.g., a first logic state). When the sensing current IDD_S is less than the limit current ILM, the overcurrent determiner 141 may output the first signal SG1 set to a low level (e.g., a second logic state different from the first logic state). However, this is an example. For example, the first signal SG1 may have the low level when the sensing current IDD_S is greater than or equal to the limit current ILM and may have the high level when the sensing current IDD_S is less than the limit current ILM. The driving voltage code generator 143-1 may operate in response to the first signal SG1 thus changed.

In an embodiment of the present disclosure, the expression "a signal has a high level" may refer to the expression "the signal has a first state" or "the signal has a first logic state", and the expression "the signal has a low level" may refer to the expression "the signal has a second state" or "the signal has a second logic state".

Also, in an embodiment of the present disclosure, the expression "the signal has a first state" or "the signal has a first logic state" may refer to a state where the signal has a logic level corresponding to "1", and the expression "the signal has a second state" or "the signal has a second logic state" may refer to a state where the signal has a logic level corresponding to "0". However, this is an example, and a state of a signal according to an embodiment of the present disclosure is not limited thereto. For example, in an embodiment of the present disclosure, the expression "the signal has a first state" or 'the signal has a first logic state" may refer to a state where the signal has a logic level corresponding to "0", and the expression "the signal has a second state" or "the signal has a second logic state" may refer to a state where the signal has a logic level corresponding to "1".

The rush control determiner 142 may compare the load LD[N−1] of the (N−1)-th image data I_DS[N−1] and the limit load LDLM to calculate a first information signal. The limit load LDLM may be used as a criterion for determining the magnitude of the load LD[N−1] of the (N−1)-th image data I_DS[N−1]. The rush control determiner 142 may receive the load LD[N−1] of the (N−1)-th image data I_DS[N−1] from the load representative value calculator 112 of the power control unit 110.

When the load LD[N−1] of the (N−1)-th image data I_DS[N−1] is relatively great and a load of the N-th image data is relatively great, because the load LD[N−1] of the (N−1)-th image data I_DS[N−1] is relatively great, the scale factor SF[N] having a relatively small value may be applied to the N-th image data. As such, at the N-th frame, the driving current Ids (refer to FIG. 4) of the display panel DP (refer to FIG. 3) may be relatively small. That is, at the N-th frame, the power consumption of the display panel DP (refer to FIG. 3) may decrease.

Also, even though the sensing current IDD_S is greater than the limit current ILM, when the load LD[N−1] of the (N−1)-th image data I_DS[N−1] is relatively great, the scale factor SF[N] may be small, and thus, the increase in power consumption of the display panel DP (refer to FIG. 3) may be relatively small.

In this case, the load LD[N−1] of the (N−1)-th image data I_DS[N−1] being relatively great may mean that an image of a relatively high grayscale is displayed by using the (N−1)-th image data I_DS[N−1], and that the load of the N-th image data is relatively great may mean that an image of a relatively high grayscale is displayed by using the N-th image data.

When the load LD[N−1] of the (N−1)-th image data I_DS[N−1] is relatively small and the load of the N-th image data is relatively great, because the load LD[N−1] of the (N−1)-th image data I_DS[N−1] is relatively small, the scale factor SF[N] having a relatively great value may be applied to the N-th image data.

When the scale factor SF[N] having a relatively great value is applied, the driving current Ids (refer to FIG. 4) of the display panel DP (refer to FIG. 3) may be relatively great at the N-th frame. That is, at the N-th frame, the power consumption of the display panel DP (refer to FIG. 3) may increase. However, according to the present disclosure, when the load LD[N−1] of the (N−1)-th image data I_DS [N−1] is less than or equal to the limit load LDLM, to decrease the power consumption of the display panel DP (refer to FIG. 3), the rush control determiner 142 may output the first information signal at the high level at the N-th frame. That is, the rush control determiner 142 may prevent the power consumption of the display panel DP (refer to FIG. 3) from increasing at the N-th frame in consideration of the load LD[N−1]. It may be possible to prevent a phenomenon in which a line is burnt due to heat generated by the power consumption. That is, the stability of the display panel DP (refer to FIG. 3) may be secured. Accordingly, the display device DD (refer to FIG. 3) whose reliability is increased may be provided.

When the load LD[N−1] of the (N−1)-th image data I_DS[N−1] is greater than the limit load LDLM, the rush control determiner 142 may output the first information signal at the low level.

In an embodiment of the present disclosure, the limit load LDLM is exactly or about 75% of the maximum load of image data. The maximum load of image data may be a load of image data of the 255 gray level. For example, the limit load LDLM may be a load of image data of the 224 gray level. In the embodiment, when the load LD[N−1] of the (N−1)-th image data I_DS[N−1] is less than or equal to exactly or about 75%, the rush control determiner 142 may output the first information signal at the high level; when the load LD[N−1] of the (N−1)-th image data I_DS[N−1] is greater than about 75%, the rush control determiner 142 may output the first information signal at the low level.

The rush control determiner 142 may compare the driving voltage code VDDCC-1 and the limit voltage VDLM to calculate a second information signal. The limit voltage VDLM may be used as a criterion for determining the magnitude of the driving voltage code VDDCC-1. The rush control determiner 142 may receive the driving voltage code VDDCC-1 corresponding to the driving voltage ELVDD (refer to FIG. 3) from the driving voltage determining unit 130. The rush control determiner 142 may receive the limit voltage VDLM from the limit voltage calculating unit 120.

In FIG. 11A, a horizontal axis represents a dimming gain (Dim Gain), and a vertical axis represents the driving voltage ELVDD. For example, the driving voltage ELVDD may be the minimum value of the driving voltage ELVDD provided to the display panel DP (refer to FIG. 3). Referring to FIG. 11A, the limit voltage VDLM may be calculated based on the dimming signal DIM. The dimming signal DIM may include the dimming gain signal.

The driving voltage ELVDD may be set in proportion to the dimming gain. The driving voltage ELVDD may increase as the dimming gain increases and may decrease as the dimming gain decreases.

When the driving voltage ELVDD of the driving voltage code VDDCC-1 is less than or equal to the limit voltage VDLM, the rush control determiner 142 may output the second information signal at the high level to reduce power consumption due to the operation of the first transistor T1 (refer to FIG. 4) that is performed based on the sharply increasing driving voltage ELVDD of the display panel DP (refer to FIG. 3).

When the driving voltage ELVDD of the driving voltage code VDDCC-1 is greater than the limit voltage VDLM, the rush control determiner 142 may output the second information signal at the low level. That is, when the driving voltage ELVDD belongs to a first area AA1, the rush control determiner 142 may output the second information signal at the low level.

The limit voltage calculating unit 120 may set the driving voltage ELVDD, which corresponds to a point in time when the dimming gain has a first value A1, to the limit voltage VDLM. For example, the limit voltage VDLM may be 16 V.

In FIG. 11B, a horizontal axis represents a dimming peak (Dim Peak), and a vertical axis represents the driving voltage ELVDD. For example, the driving voltage ELVDD may be the minimum value of the driving voltage ELVDD provided to the display panel DP (refer to FIG. 3).

Referring to FIG. 11B, the limit voltage VDLM may be calculated based on the dimming signal DIM. The dimming signal DIM may include the dimming peak signal.

The driving voltage ELVDD may increase as the dimming peak increases and may decrease as the dimming peak decreases.

When the driving voltage ELVDD of the driving voltage code VDDCC-1 is less than or equal to the limit voltage VDLM, the rush control determiner 142 may output the second information signal at the high level to reduce power consumption due to the operation of the first transistor T1 (refer to FIG. 4) that is performed based on the sharply increasing driving voltage ELVDD of the display panel DP (refer to FIG. 3).

When the driving voltage ELVDD of the driving voltage code VDDCC-1 is greater than the limit voltage VDLM, the rush control determiner 142 may output the second information signal at the low level. That is, when the driving voltage ELVDD belongs to a second area AA2, the rush control determiner 142 may output the second information signal at the low level.

The limit voltage calculating unit 120 may set the driving voltage ELVDD, which corresponds to a point in time when the dimming gain has a second value A2, to the limit voltage VDLM. For example, the limit voltage VDLM may be 16 V.

When both the first information signal and the second information signal have the low level, the rush control determiner 142 may output a second signal SG2 having the low level. When at least one of the first information signal and the second information signal is at the high level, the rush control determiner 142 may output the second signal SG2 having the high level. For example, the rush control determiner 142 may include an OR operator (or an OR logic gate) that receives the first information signal and the second information signal and outputs the second signal SG2.

The rush control determiner 142 may output the second signal SG2 based on the first information signal and the second information signal. The second signal SG2 may be used to determine whether to ignore the first signal SG1. For example, when the second signal SG2 is at the high level, the driving voltage controller 143 may operate depending on the first signal SG1; when the second signal SG2 is at the low level, the driving voltage controller 143 may operate regardless of the first signal SG1 or without considering the first signal SG1.

For example, the driving voltage controller 143 may receive the first signal SG1 and the second signal SG2. The driving voltage controller 143 may output the driving voltage control signal VCS for controlling the driving voltage ELVDD, based on the first signal SG1 and the second signal SG2. The driving voltage controller 143 may include a driving voltage code generator 143-1 (e.g., a logic circuit) and a driving voltage converter 143-2 (e.g., a logic circuit).

The driving voltage code generator 143-1 may output a driving voltage control code VDDCC-2 based on the first signal SG1 and the second signal SG2. When both the first signal SG1 and the second signal SG2 are at the high level, the driving voltage code generator 143-1 may output the driving voltage control code VDDCC-2 for decreasing the driving voltage ELVDD. That is, when at least one of a first condition that the load LD[N−1] is less than or equal to the limit load LDLM and a second condition that the driving voltage ELVDD is less than or equal to the limit voltage VDLM is satisfied and when the sensing current IDD_S is greater than or equal to the limit current ILM, the driving voltage controller 143 may output the driving voltage control signal VCS for decreasing the driving voltage ELVDD.

When the first signal SG1 is at the low level, because a current compensation operation is not needed, the driving voltage code generator 143-1 may output the driving voltage control code VDDCC-2 for maintaining the driving voltage ELVDD.

That is, when at least one of the first condition that the load LD[N−1] is less than or equal to the limit load LDLM and the second condition that the driving voltage ELVDD is less than or equal to the limit voltage VDLM is satisfied and when the sensing current IDD_S is less than the limit current ILM, the driving voltage controller 143 may output the driving voltage control signal VCS for maintaining the driving voltage ELVDD. When the second signal SG2 is at the low level, the driving voltage code generator 143-1 may operate regardless of the first signal SG1 of the overcurrent determiner 141. That is, when the second signal SG2 is at the low level, even though the first signal SG1 is at the high level, the driving voltage code generator 143-1 may output the driving voltage control code VDDCC-2 for maintaining the driving voltage ELVDD.

That is, when the load LD[N−1] is greater than the limit load LDLM, the driving voltage ELVDD is greater than the limit voltage VDLM, and the sensing current IDD_S is greater than or equal to the limit current ILM, the driving voltage controller 143 may output the driving voltage control signal VCS for maintaining the driving voltage ELVDD; when the load LD[N−1] is greater than the limit load LDLM, the driving voltage ELVDD is greater than the limit voltage VDLM, and the sensing current IDD_S is less than the limit current ILM, the driving voltage controller 143 may output the driving voltage control signal VCS for maintaining the driving voltage ELVDD.

That is, when at least one of the first signal SG1 and the second signal SG2 is at the low level, the driving voltage code generator 143-1 may output the driving voltage control code VDDCC-2 for maintaining the driving voltage ELVDD.

When the first signal SG1 is at the high level and the second signal SG2 is at the high level, the driving voltage code generator 143-1 may output the driving voltage control code VDDCC-2 for decreasing the driving voltage ELVDD.

The driving voltage converter 143-2 may convert the driving voltage control code VDDCC-2 into the driving voltage control signal VCS. The driving voltage converter 143-2 may convert the driving voltage control code VDDCC-2 being a digital signal into the driving voltage control signal VCS being an analog signal so as to be provided to the voltage generator 300 (refer to FIG. 3).

Figure 12A:
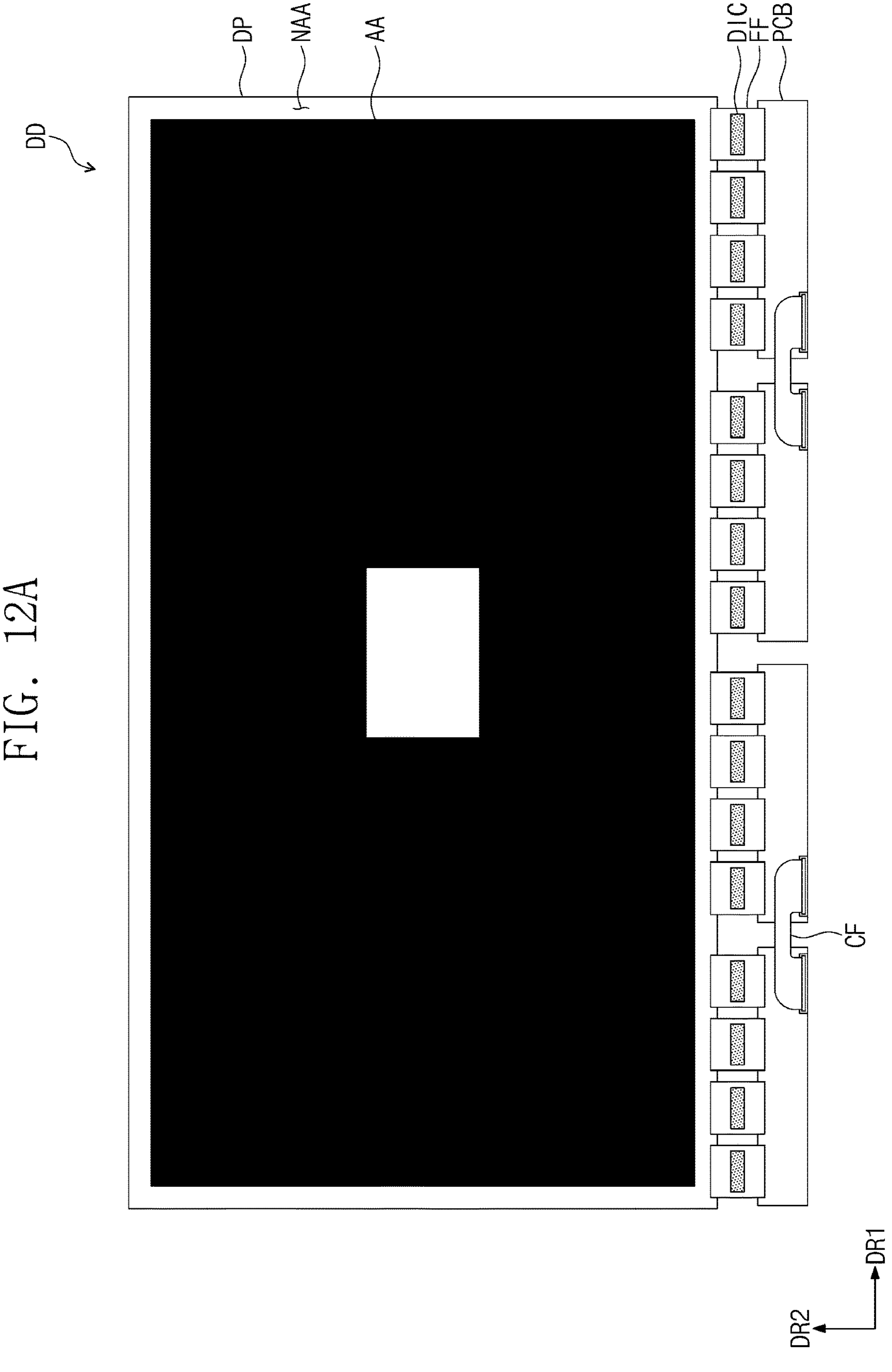
FIGS. 12A to 12C are diagrams illustrating images displayed in a display panel, according to an embodiment of the present disclosure.
Figure 12B:
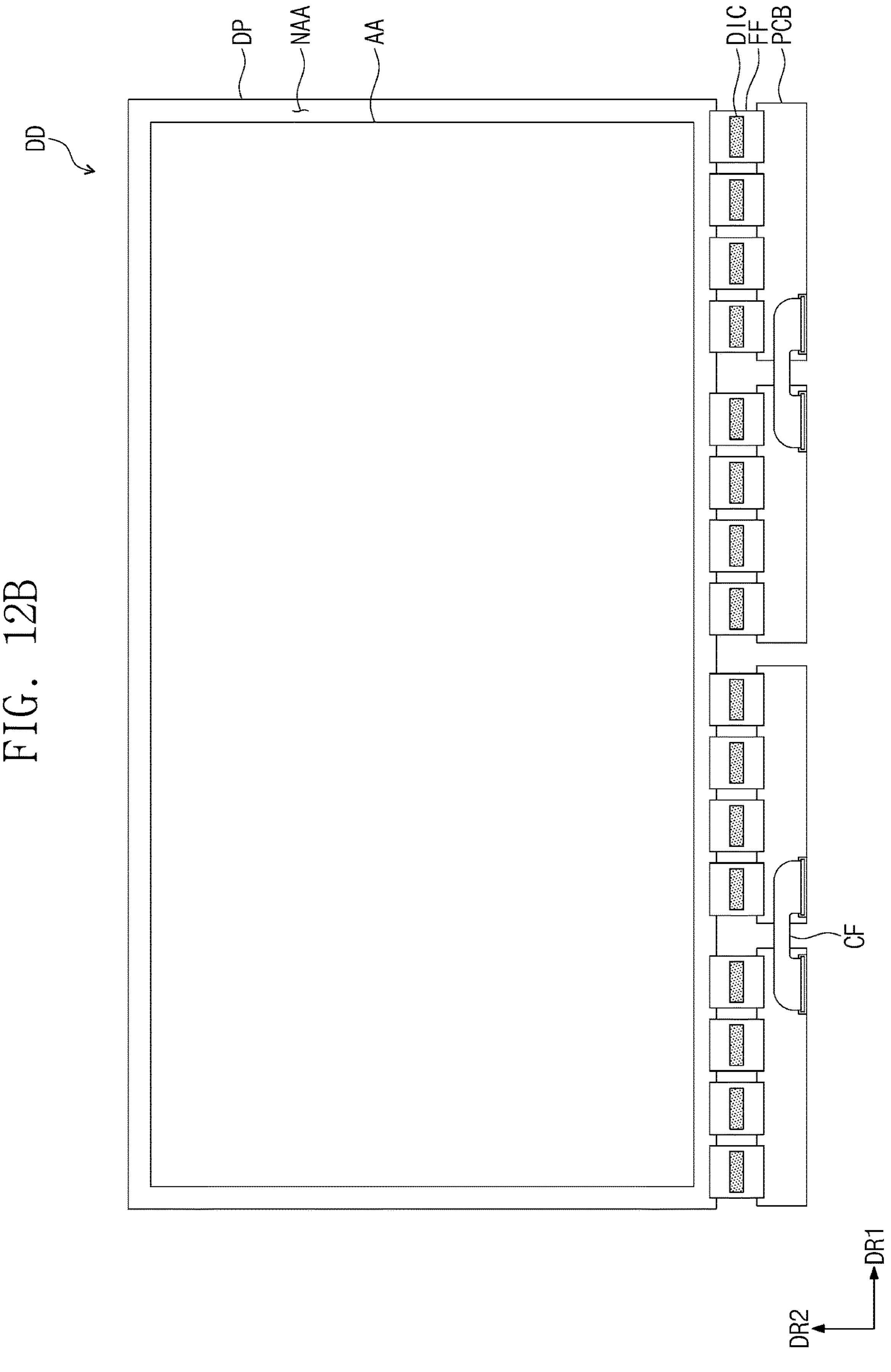
Figure 12C:
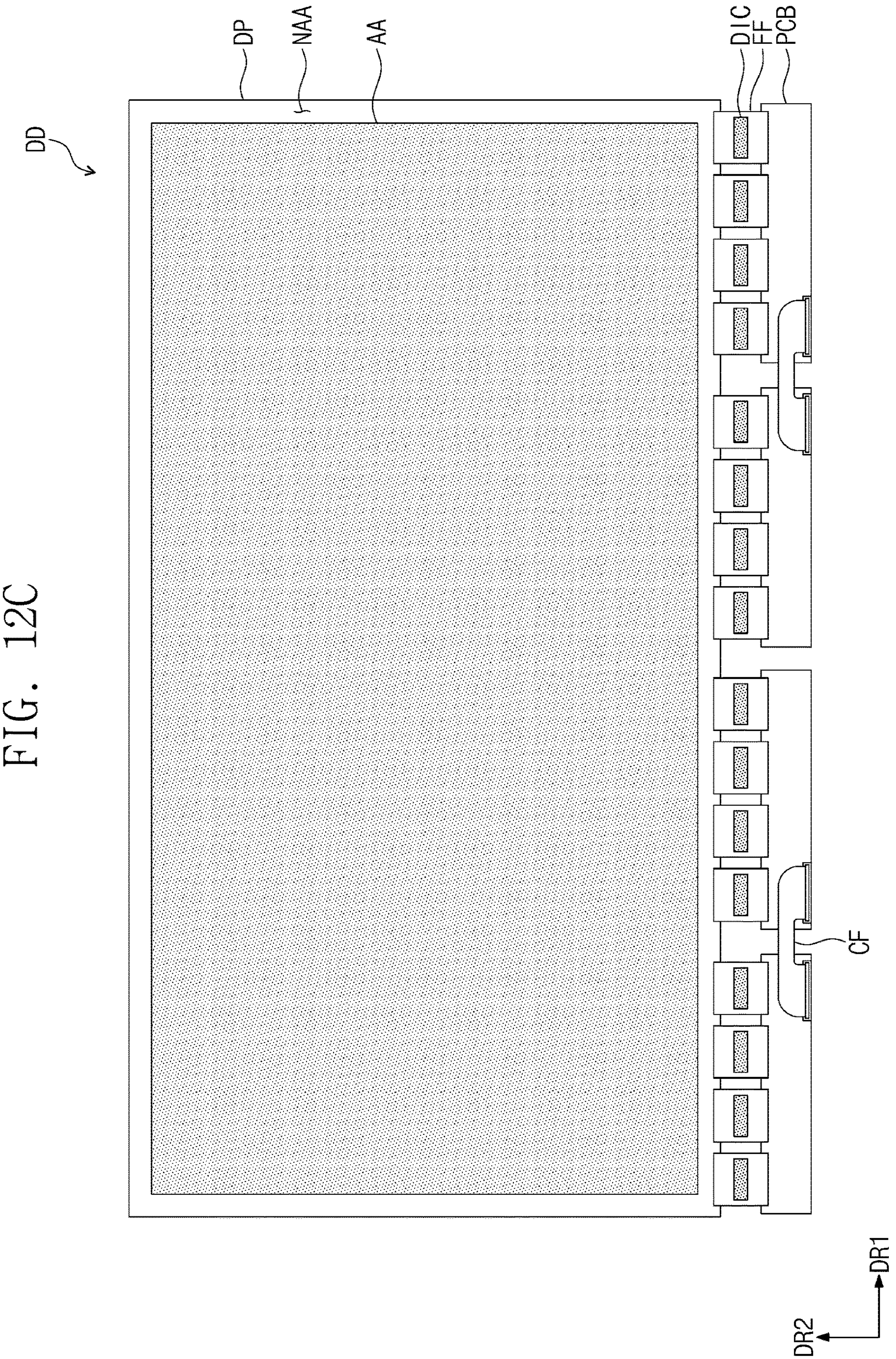
Figure 13:
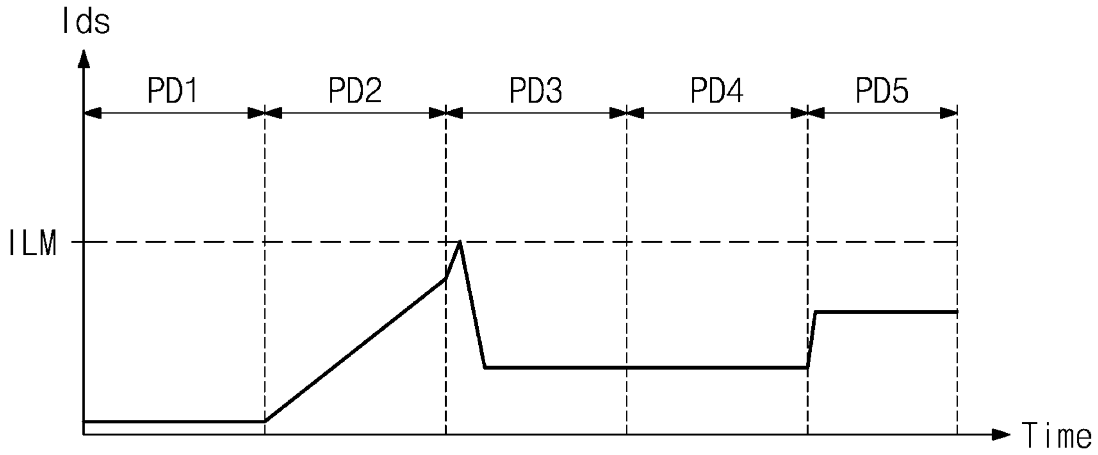
FIG. 13 is a graph illustrating a change in a driving current for each frame, according to an embodiment of the present disclosure.
Figure 14:
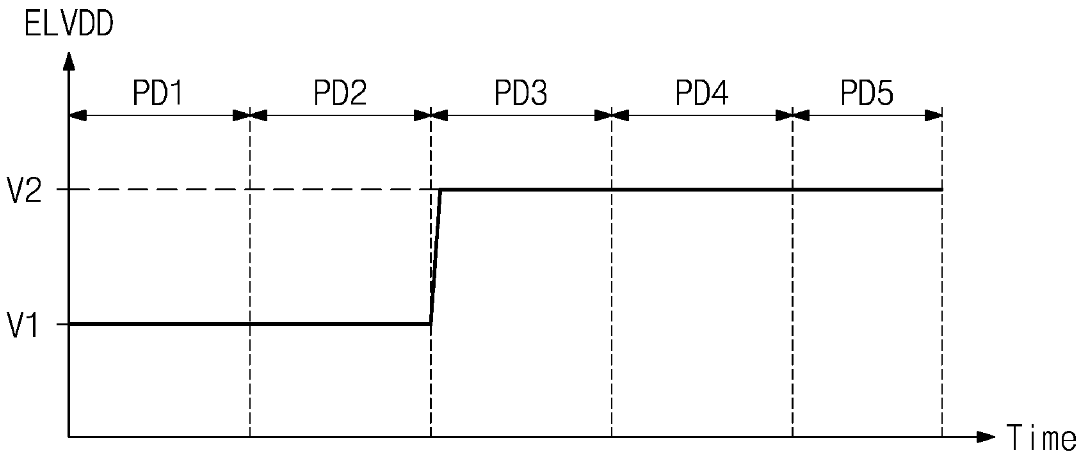
FIG. 14 is a graph illustrating a change in a driving voltage for each frame, according to an embodiment of the present disclosure.

FIGS. 12A to 12C are diagrams illustrating images displayed in a display panel, according to an embodiment of the present disclosure. FIG. 13 is a graph illustrating a change in a driving current for each frame, according to an embodiment of the present disclosure. FIG. 14 is a graph illustrating a change in a driving voltage for each frame, according to an embodiment of the present disclosure. In the description of FIGS. 12A to 12C, the components that are described with reference to FIG. 2 are marked by the same reference numerals, and thus, additional description will be omitted to avoid redundancy.

Unlike FIG. 2, an example in which four circuit boards PCB are provided in the display device DD is illustrated in FIGS. 12A to 12C.

Referring to FIGS. 10, 12A, 13, and 14, during a first frame PD1 (or first frame period), a first image may be displayed in the display panel DP. The image signal RGB (refer to FIG. 3) of the first image may have the load of 1% and the 96 gray level.

The first image may be an image whose dimming gain value or dimming peak value is relatively small. In this case, the dimming gain value may be a variable that is defined such that the luminance increases or decreases at a given ratio depending on the load, and the dimming peak value may be a variable that is defined such that only a peak value of the luminance increases or decreases depending on the load. In the first frame PD1, the driving voltage ELVDD may have a first voltage V1. The first voltage V1 may have a relatively small value. For example, the first voltage V1 may be 15 V.

In the first frame PD1, the first transistor T1 (refer to FIG. 4) may operate in the saturation region. For example, in the first frame PD1, the gate-source voltage $V_{GS}$ of the first transistor T1 (refer to FIG. 4) may be 1 V, and the drain-source voltage $V_{DS}$ thereof may be 2 V.

In the first frame PD1, the driving current Ids may be less than the limit current ILM.

Referring to FIGS. 10, 12B, 13, and 14, a second frame PD2 may be provided after the first frame PD1. During the second frame PD2, a second image may be displayed in the display panel DP. The second image may be a full white image. The image signal RGB (refer to FIG. 3) of the second image may have the load of 100% and the 255 gray level. The second frame PD2 may be the first frame whose load LD (refer to FIG. 5) varies and may be a non-compensation frame to which the current compensation operation of the overcurrent protecting unit 140 (refer to FIG. 5) is not applied.

In the second frame PD2, the driving voltage ELVDD may have the first voltage V1.

In the second frame PD2, the first transistor T1 (refer to FIG. 4) may operate in the linear region. For example, in the second frame PD2, the gate-source voltage $V_{GS}$ of the first transistor T1 (refer to FIG. 4) may be 5 V, and the drain-source voltage $V_{DS}$ thereof may be 0.5 V.

As the first transistor T1 (refer to FIG. 4) operates in the linear region, in the second frame PD2, the driving current Ids may gradually increase. In the second frame PD2, the driving current Ids may be less than the limit current ILM.

Referring to FIGS. 10, 12C, 13, and 14, a third frame PD3 may be provided after the second frame PD2. During the third frame PD3, a third image may be displayed in the display panel DP. The third image may be a full white image. The image signal RGB (refer to FIG. 3) of the third image may have the load of 100% and the 255 gray level. The third frame PD3 may be a frame to which the current compensation operation of the overcurrent protecting unit 140 is applied. During the third frame PD3, an image having a grayscale lower than a white grayscale through the current compensation operation of the overcurrent protecting unit 140 may be displayed in the display panel DP.

The dimming gain or dimming peak of the third image may be relatively increased by the image signal RGB (refer to FIG. 3) of the second frame PD2 being a previous frame. In the third frame PD3, the driving voltage ELVDD may increase from the first voltage V1 to a second voltage V2. For example, the second voltage V2 may be 20 V.

In the third frame PD3, the first transistor T1 (refer to FIG. 4) may operate in the saturation region. For example, in the third frame PD3, the gate-source voltage $V_{GS}$ of the first transistor T1 (refer to FIG. 4) may be 5 V, and the drain-source voltage $V_{DS}$ thereof may be 6 V. In the third frame PD3, the first transistor T1 (refer to FIG. 4) may belong to the saturation region. In the third frame PD3, the driving current Ids may increase due to the first transistor T1 (refer to FIG. 4) belonging to the saturation region and the increase in the driving voltage ELVDD.

When the sensing current IDD_S obtained by sensing the driving current Ids is greater than or equal to the limit current ILM, the overcurrent determiner 141 may output the first signal SG1 at the high level.

Because the driving voltage ELVDD of the driving voltage code VDDCC-1 of the second frame PD2 is less than or equal to the limit voltage VDLM, to reduce the power consumption of the display panel DP (refer to FIG. 3), the rush control determiner 142 may output the second information signal at the high level.

When at least one of the first information signal and the second information signal is at the high level, the rush control determiner 142 may output the second signal SG2 at the high level.

When both the first signal SG1 and the second signal SG2 are at the high level, the driving voltage code generator 143-1 may output the driving voltage control code VDDCC-2 for decreasing the driving voltage ELVDD. As such, the driving current Ids that is less than or equal to the limit current ILM may be provided.

According to the present disclosure, when the driving voltage ELVDD of the driving voltage code VDDCC-1 of the (N−1)-th frame is less than or equal to the limit voltage VDLM, to reduce the power consumption of the display panel DP (refer to FIG. 3), the rush control determiner 142 may output the second information signal set to the high level at the N-th frame. That is, the rush control determiner 142 may prevent the power consumption of the display panel DP (refer to FIG. 3) from increasing at the N-th frame in consideration of the driving voltage ELVDD. It may be possible to prevent a phenomenon in which a line is burnt due to heat generated by the power consumption. That is, the stability of the display panel DP (refer to FIG. 3) may be secured. Accordingly, the display device DD (refer to FIG. 3) whose reliability is increased may be provided.

According to an embodiment the present disclosure, only when both the first information signal and the second information signal are at the low level, the rush control determiner 142 output the second signal SG2 having the low level. When only the second signal SG2 is at the low level, the driving voltage code generator 143-1 may operate regardless of the first signal SG1 and may maintain the driving voltage ELVDD. That is, it may be possible to prevent power consumption from increasing due when a current greater than the limit current ILM is applied to the display panel DP (refer to FIG. 3) while the operation of the overcurrent protecting unit 140 is skipped in a situation where the current compensation operation is required. Accordingly, it may be possible to prevent a phenomenon in which a line is burnt due to heat generated by the power consumption. That is, the stability of the display panel DP (refer to FIG. 3) may be secured. According to the above description, the display device DD (refer to FIG. 3) whose reliability is increased may be provided.

A fourth frame PD4 and a fifth frame PD5 may be sequentially provided after the third frame PD3. In the fourth frame PD4 and the fifth frame PD5, a full white image may be displayed.

As the full white images are displayed in the third frame PD3 and the following frames, the load LD (refer to FIG. 5) of image data may be greater than the limit load LDLM; in this case, the rush control determiner 142 may output the first information signal at the low level.

Because the driving voltage ELVDD of the driving voltage code VDDCC-1 is greater than the limit voltage VDLM in the third frame PD3 and the following frames, the rush control determiner 142 may output the second information signal at the low level.

When both the first information signal and the second information signal are at the low level, the rush control determiner 142 may output the second signal SG2 having the low level.

According to the above description, when a driving voltage of the (N−1)-th frame is less than or equal to a limit voltage, to reduce the power consumption of a display panel, a rush control determiner may output a second information signal set to a high level at the N-th frame. That is, the rush control determiner may prevent the power consumption of the display panel from increasing at the N-th frame in consideration of the driving voltage. Accordingly, it may be possible to prevent a phenomenon in which a line is burnt due to heat generated by the power consumption. That is, the stability of the display panel may be secured. Accordingly, a driving controller whose reliability is increased and a display device including the same may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:
- a display panel including a plurality of pixels;
- a voltage generator configured to provide a driving voltage to the plurality of pixels; and
- a driving controller configured to receive an image signal and to drive the plurality of pixels,
- wherein the driving controller includes an overcurrent protecting circuit,
- wherein the overcurrent protecting circuit includes:
  - a first logic circuit configured to compare a limit current with a sensing current generated by sensing a driving current flowing to the plurality of pixels to generate a first comparison result;
  - a second logic circuit configured to compare a load of previous image data of the image signal with a limit load to generate a second comparison result and to compare the driving voltage with a limit voltage to generate a third comparison result; and
  - a driving voltage controller configured to output a driving voltage control signal for controlling the driving voltage to the voltage generator,
- wherein, when the first comparison result indicates the sensing current is greater than or equal to the limit current, the second comparison result indicates the load is greater than the limit load and the third comparison result indicates the driving voltage is greater than the limit voltage, the driving voltage controller outputs the driving voltage control signal for maintaining the driving voltage for present image data of the image signal.

2. The display device of claim 1, wherein, when the first comparison result indicates the sensing current is less than the limit current and the second comparison result indicates the load is less than or equal to the limit load, the driving voltage controller outputs the driving voltage control signal for maintaining the driving voltage.

3. The display device of claim 1, wherein, when the first comparison result indicates the sensing current is less than the limit current and the third comparison result indicates the driving voltage is less than or equal to the limit voltage, the driving voltage controller outputs the driving voltage control signal for maintaining the driving voltage.

4. The display device of claim 1, wherein, when the first comparison result indicates the sensing current is greater than or equal to the limit current, and at least one of the second comparison result indicates the load is less than or equal to the limit load and the third comparison result indicates that the driving voltage is less than or equal to the limit voltage, the driving voltage controller outputs the driving voltage control signal for decreasing the driving voltage.

5. The display device of claim 1, wherein, when the first comparison result indicates the sensing current is less than the limit current, the second comparison result indicates the load is greater than the limit load and the third comparison result indicates the driving voltage is greater than the limit voltage, the driving voltage controller outputs the driving voltage control signal for maintaining the driving voltage.

6. The display device of claim 1, wherein the driving voltage controller includes:
- a driving voltage code generator connected to the first logic circuit and the second logic circuit, and configured to output a driving voltage control code; and
- a driving voltage converter configured to output the driving voltage control signal based on the driving voltage control code.

7. The display device of claim 1, wherein the driving controller further includes a power control circuit, a limit voltage calculating circuit, and a driving voltage determining circuit.

8. The display device of claim 7, wherein each of the power control circuit, the limit voltage calculating circuit, and the driving voltage determining circuit is connected to the overcurrent protecting circuit.

9. The display device of claim 7, wherein the power control circuit receives image data generated based on the image signal, and a dimming signal and outputs the load of the previous image data.

10. The display device of claim 9, wherein the dimming signal includes a dimming gain signal and a dimming peak signal.

11. The display device of claim 9, wherein the limit voltage calculating circuit receives the dimming signal and outputs the limit voltage based on the dimming signal.

12. The display device of claim 11, wherein the driving voltage determining circuit receives the image signal and outputs the driving voltage based on the image signal.

13. The display device of claim 9, wherein the limit load is about 75% of a maximum load of the image data.

14. A driving controller comprising:
- a first logic circuit configured to compare a limit current with a sensing current generated by sensing a driving current flowing to a display panel to generate a first comparison result;
- a second logic circuit configured to compare a load of previous image data with a limit load to generate a second comparison result and to compare a driving voltage with a limit voltage to generate a third comparison result; and
- a driving voltage controller configured to output a driving voltage control signal for controlling the driving voltage to the display panel,
- wherein, when the first comparison result indicates the sensing current is greater than or equal to the limit current, the second comparison result indicates the load is greater than the limit load and the third comparison result indicates the driving voltage is greater than the limit voltage, the driving voltage controller outputs the driving voltage control signal for maintaining the driving voltage for present image data.

15. The driving controller of claim 14, wherein, when the first comparison result indicates the sensing current is less than the limit current and at least one of the second comparison result indicates the load is less than or equal to the limit load and the third comparison results indicates the driving voltage is smaller than or equal to the limit voltage, the driving voltage controller outputs the driving voltage control signal for maintaining the driving voltage.

16. The driving controller of claim 14, wherein, when the first comparison result indicates the sensing current is less than the limit current, the second comparison result indicates the load is greater than the limit load and the third comparison result indicates the driving voltage is greater than the limit voltage, the driving voltage controller outputs the driving voltage control signal for maintaining the driving voltage.

17. The driving controller of claim 16, wherein, when the first comparison result indicate the sensing current is greater than or equal to the limit current and at least one the second comparison result indicates the load is less than or equal to the limit load and the third comparison result indicates the driving voltage is less than or equal to the limit voltage, the driving voltage controller outputs the driving voltage control signal for decreasing the driving voltage.

18. The driving controller of claim 14, further comprising:

a power control circuit, a limit voltage calculating circuit, and a driving voltage determining circuit, wherein the power control circuit receives image data and a dimming signal and outputs the load of the previous image data.

19. The driving controller of claim 18, wherein the limit voltage calculating circuit receives the dimming signal and outputs the limit voltage based on the dimming signal.

20. The driving controller of claim 19, wherein the driving voltage determining circuit receives an image signal and outputs the driving voltage based on the image signal.

* * * * *